United States Patent
Ueya et al.

(10) Patent No.: US 12,410,075 B2
(45) Date of Patent: Sep. 9, 2025

(54) WATER SOFTENING DEVICE

(71) Applicant: Panasonic Intellectual Property Management Co., Ltd., Osaka (JP)

(72) Inventors: Noriyoshi Ueya, Osaka (JP); Mai Saito, Osaka (JP); Yasunari Maeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 380 days.

(21) Appl. No.: 17/925,820

(22) PCT Filed: Apr. 8, 2021

(86) PCT No.: PCT/JP2021/014900
§ 371 (c)(1),
(2) Date: Nov. 16, 2022

(87) PCT Pub. No.: WO2021/235128
PCT Pub. Date: Nov. 25, 2021

(65) Prior Publication Data
US 2023/0183105 A1   Jun. 15, 2023

(30) Foreign Application Priority Data

May 22, 2020 (JP) .................................. 2020-089790

(51) Int. Cl.
  *C02F 1/461* (2023.01)
  *C02F 1/00* (2023.01)
  *C02F 5/00* (2023.01)
(52) U.S. Cl.
  CPC ............ *C02F 1/4618* (2013.01); *C02F 1/008* (2013.01); *C02F 5/00* (2013.01);
  (Continued)
(58) Field of Classification Search
  None
  See application file for complete search history.

(56) References Cited

U.S. PATENT DOCUMENTS 5,580,445 A    12/1996   Iwatsuka et al.
5,728,274 A *  3/1998    Kamitani ............... C02F 1/4618
                                                        204/263
(Continued)

FOREIGN PATENT DOCUMENTS

EP    0659483 A2    6/1995
EP    3056473 A1    8/2016
(Continued)

OTHER PUBLICATIONS

Office Action for corresponding Chinese Patent Application No. 202080023938.9 dated Nov. 10, 2022 together with a Search Report, which corresponds to the related U.S. Appl. No. 17/442,391, and its English translation.
(Continued)

*Primary Examiner* — Louis J Rufo
(74) *Attorney, Agent, or Firm* — Renner, Otto, Boisselle & Sklar, LLP

(57) ABSTRACT

A water softening device includes an electrolysis device, a first circulation flow path and a second circulation flow path, a first sensor, a second sensor, and a controller, wherein the controller controls the electrolysis device to execute a first mode in which the alkaline water is allowed to flow through the first circulation flow path and the acidic water is allowed to flow through the second circulation flow path, and a second mode in which the acidic water is allowed to flow through the first circulation flow path (8A) and the alkaline water is allowed to flow through the second circulation flow path, and controls to stop electrolysis by the electrolysis device based on a detection value of the first sensor or the second sensor in the first mode and the second mode.

5 Claims, 18 Drawing Sheets

(52) U.S. Cl.
CPC ............ *C02F 2201/005* (2013.01); *C02F 2201/46125* (2013.01); *C02F 2201/46145* (2013.01); *C02F 2209/055* (2013.01); *C02F 2209/06* (2013.01); *C02F 2209/10* (2013.01); *C02F 2209/11* (2013.01); *C02F 2301/046* (2013.01)

(56) References Cited

U.S. PATENT DOCUMENTS

| | | | | |
|---|---|---|---|---|
| 6,294,073 | B1* | 9/2001 | Shirota | C02F 1/4618 205/749 |
| 9,284,653 | B2* | 3/2016 | Nakamoto | C25B 1/26 |
| 11,339,072 | B2 | 5/2022 | Takehisa et al. | |
| 2010/0219372 | A1 | 9/2010 | Hook et al. | |
| 2011/0056876 | A1 | 3/2011 | Ide | |
| 2012/0267256 | A1* | 10/2012 | Kindred | C02F 1/4618 205/746 |
| 2014/0116889 | A1 | 5/2014 | Nakamoto | |
| 2015/0225265 | A1 | 8/2015 | Terashima et al. | |
| 2017/0113957 | A1 | 4/2017 | Eckelberry | |
| 2017/0313602 | A1 | 11/2017 | Matsumoto et al. | |
| 2019/0240629 | A1 | 8/2019 | Nakamoto | |
| 2021/0221722 | A1 | 7/2021 | Maeda | |
| 2022/0169542 | A1 | 6/2022 | Takehisa et al. | |
| 2022/0169548 | A1 | 6/2022 | Takehisa et al. | |

FOREIGN PATENT DOCUMENTS

| | | |
|---|---|---|
| EP | 3950601 A1 | 2/2022 |
| EP | 3950604 A1 | 2/2022 |
| JP | H08-182988 A | 7/1996 |
| JP | 3145240 B2 | 3/2001 |
| JP | 2004-271048 A | 9/2004 |
| JP | 2005-319427 A | 11/2005 |
| JP | 3122342 U | 6/2006 |
| JP | 2009-165954 A | 7/2009 |
| JP | 2009-165955 A | 7/2009 |
| JP | 2009-233503 A | 10/2009 |
| JP | 2010-221127 A | 10/2010 |
| JP | 2011-045802 A | 3/2011 |
| JP | 2011-056345 A | 3/2011 |
| JP | 2011-161407 A | 8/2011 |
| JP | 2013-013853 A | 1/2013 |
| JP | 2014-076421 A | 5/2014 |
| JP | 2015-213569 A | 12/2015 |
| JP | 2020-163364 A | 10/2020 |
| JP | 2020-163365 A | 10/2020 |
| WO | 2007/132685 A1 | 11/2007 |
| WO | 2010/067454 A1 | 6/2010 |
| WO | 2011142060 A1 | 11/2011 |
| WO | 2015052840 A1 | 4/2015 |
| WO | 2018/159693 A1 | 9/2018 |

OTHER PUBLICATIONS

Office Action for corresponding Chinese Patent Application No. 202080023923.2 dated Nov. 22, 2022 together with a Search Report, which corresponds to the related U.S. Appl. No. 17/442,361, and its English translation.

International Preliminary Report on Patentability for corresponding International Application No. PCT/JP2021/014900 (Chapter I of the Patent Cooperation Treaty) (IB/326) with an English translation thereof (IB/338).

English translation of Publication technical report from Japan Institute of Invention and Innovation (Publication technical No. 2006-504982) as published on Sep. 12, 2006 (Japanese Publication technical report itself previously filed without English translation as an I.D.S. on Nov. 16, 2022.).

Decision of Refusal for related Japanese Application No. 2022-524322 dated Dec. 19, 2023 and its English machine translation.

Office Action for related U.S. Appl. No. 17/442,361 dated Mar. 14, 2024.

Office Action for related U.S. Appl. No. 17/442,391 dated Mar. 15, 2024.

International Search Report for corresponding Application No. PCT/JP2020/005179, mailed Apr. 21, 2020.

Extended European Search Report for corresponding European Application No. 20777932.3 issued Mar. 22, 2022.

International Search Report for related Application No. PCT/JP2020/005183, mailed Apr. 21, 2020.

International Preliminary Report on Patentability for corresponding International Application No. PCT/JP2020/005179 dated Sep. 28, 2021 (English translation).

International Preliminary Report on Patentability of related International Application No. PCT/JP2020/005183 dated Sep. 28, 2021 (English translation).

First Examination Report for corresponding Indian Patent Application No. 202117042946 issued on Jan. 18, 2022.

First Examination Report for corresponding Indian Patent Application No. 202117042948 issued on Jan. 4, 2022.

Extended European Search Report for corresponding European Application No. 20778763.1 issued Mar. 18, 2022.

Office Action dated Apr. 4, 2023 issued to Japanese Patent Application No. 2019-139357 which corresponds to U.S. Appl. No. 17/442,361 and its English translation.

Office Action dated Apr. 4, 2023 issued to Japanese Patent Application No. 2019-139359 which corresponds to U.S. Appl. No. 17/442,391 and its English translation.

International Search Report for corresponding Application No. PCT/JP2021/014900, mailed Jun. 22, 2021.

Publication technical report from Japan Institute of Invention and Innovation (Publication technical No. 2006-504982) as published on Sep. 12, 2006.

EESR (Extended European Search Report) for Corresponding European Application No. 21807826.9 which corresponds to U.S. Appl. No. 17/925,820 issued Aug. 14, 2023.

Notice of Reasons for Refusal for corresponding Japanese Application No. 2022-524322 which corresponds to U.S. Appl. No. 17/925,820, issued Sep. 5, 2023 and its English machine translation.

* cited by examiner

WATER SOFTENING DEVICE

TECHNICAL FIELD

The invention relates to a water softening device.

BACKGROUND ART

In hard-water regions, there are troubles due to hardness components such as scale and water deposit, and water softening devices are required. As a water softening device, there is a water softening method using an ion exchange resin (see, for example, Patent Document 1), but there is a problem of generation of a salt waste liquid due to reproduction with salt. In addition, there is a water softening method using EDI, a RO membrane, or the like (see, for example, Patent Document 2); however, there is a problem of a large amount of waste water.

PRIOR ART DOCUMENT

Patent Documents

Patent Document 1: Japanese Patent No. 3145240
Patent Document 2: WO 2007/132685 A1

SUMMARY OF THE INVENTION

Problems to be Solved by the Invention

A water softening device that softens water using electrolysis is conceivable. In such a water softening device using electrolysis, it is desirable to further reduce the hardness of soft water to be finally produced.

Therefore, an object of the invention is to solve the above problem, and to provide a water softening device capable of further reducing the hardness of soft water.

Means for Solving the Problems

In order to achieve the above object, a water softening device according to the invention includes: an electrolysis device that generates alkaline water and acidic water by electrolysis; a first circulation flow path and a second circulation flow path connected to the electrolysis device, the first circulation flow path and the second circulation flow path being capable of alternately passing the alkaline water and the acidic water generated by the electrolysis device; a first sensor that detects a parameter of water flowing through the first circulation flow path; a second sensor that detects a parameter of water flowing through the second circulation flow path; and a controller, in which the controller controls the electrolysis device to execute a first mode in which the alkaline water is allowed to flow through the first circulation flow path and the acidic water is allowed to flow through the second circulation flow path, and a second mode in which the acidic water is allowed to flow through the first circulation flow path and the alkaline water is allowed to flow through the second circulation flow path, and controls to stop electrolysis by the electrolysis device based on a detection value of the first sensor or the second sensor in the first mode and the second mode.

Effects of the Invention

According to the water softening device of the invention, the hardness of soft water can be further reduced.

MODES FOR CARRYING OUT THE INVENTION

Hereinafter, an embodiment according to the invention will be described in detail with reference to the drawings. Note that the invention is not limited by the embodiment.

Embodiment

Figure 1:
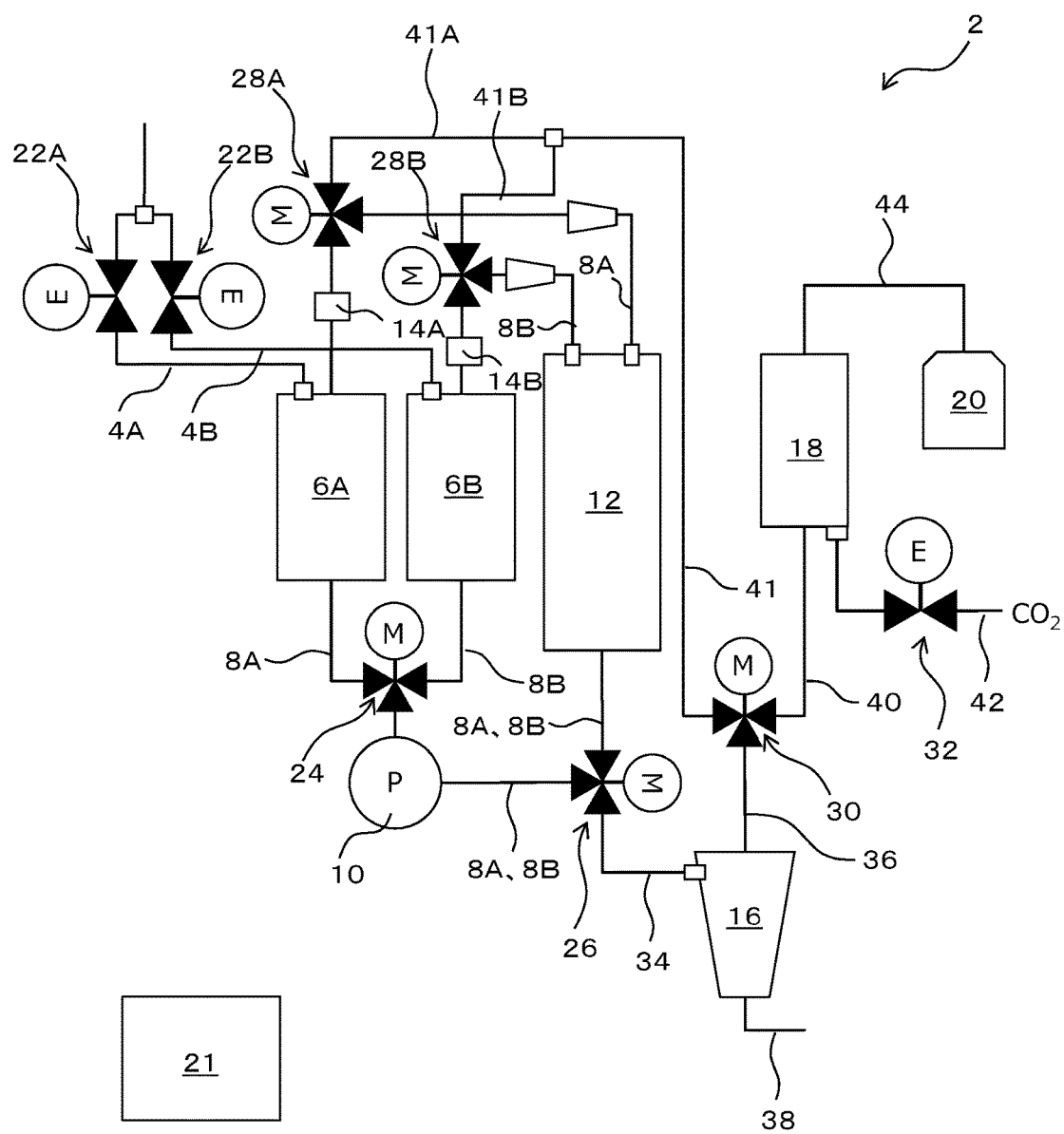
FIG. 1 is a schematic view of a water softening device according to an embodiment.

FIG. 1 is a schematic view of a water softening device 2 according to the embodiment.

The water softening device 2 is a device for removing metal ions as hardness components from water using electrolysis. The metal ions here are calcium ions ($Ca^{2+}$) and magnesium ions ($Mg^{2+}$). The water softening device 2 according to the embodiment is a water softening device for producing soft water by removing and separating metal ions from hard water to reduce the concentration (hardness) of metal ions in hard water to a predetermined concentration or less. As the definition of hard water and soft water, for example, the WHO definition may be used. That is, water with a hardness of less than 120 mg/L may be defined as soft water, and water with a hardness of 120 mg/L or more may be defined as hard water.

The water softening device 2 shown in FIG. 1 includes raw water flow paths 4A and 4B, batch treatment tanks 6A and 6B, circulation flow paths 8A and 8B, a pump 10, an electrolysis device 12, pH sensors 14A and 14B, a separation device 16, an intermediate tank 18, a water storage tank 20, and a controller 21. The water softening device 2 further includes valves 22A and 22B, a valve 24, a valve 26, valves 28A and 28B, a valve 30, and a valve 32 as various valves.

The raw water flow paths 4A and 4B are flow paths for supplying raw water to the batch treatment tanks 6A and 6B, respectively. The raw water is hard water, for example. The upstream sides of the raw water flow paths 4A and 4B are connected to a water source which is not illustrated, and the downstream sides thereof are connected to the batch treatment tanks 6A and 6B. The valves 22A and 22B are provided in the raw water flow paths 4A and 4B, respectively. Through the opening and closing of the valves 22A and 22B, the water flow/water stop from the raw water flow paths 4A and 4B to the batch treatment tanks 6A and 6B are respectively controlled.

Each of the batch treatment tanks 6A and 6B is a water storage tank for performing batch treatment. Each of the batch treatment tanks 6A and 6B is provided with a float sensor (not illustrated) which can detect the water storage amount. The circulation flow paths 8A and 8B are connected to the batch treatment tanks 6A and 6B, respectively.

The circulation flow paths 8A and 8B are two circulation flow paths connected to the batch treatment tanks 6A and 6B. The circulation flow paths 8A and 8B extend downstream from the batch treatment tanks 6A and 6B respectively, and merge at a position connected to the valve 24 to form one flow path. The circulation flow paths 8A and 8B as one flow path are connected to the electrical separation device 12 via the pump 10 and the valve 26.

Water flow/water stop from the batch treatment tanks 6A and 6B to the electrolysis device 12 are controlled by opening and closing of the valve 24 and the valve 26. By driving of the pump 10 provided between the valve 24 and the valve 26, water flows from the batch treatment tanks 6A and 6B to the downstream side.

The electrolysis device 12 is a device that generates alkaline water and acidic water by electrolyzing water supplied through the circulation flow paths 8A and 8B. The electrolysis device 12 includes a positive electrode (anode), a negative electrode (cathode), and a diaphragm provided between the positive electrode and the negative electrode, and electrolyzes water by applying a voltage between the positive electrode and the negative electrode to generate alkaline water and acidic water.

Downstream of the electrolysis device 12, the circulation flow paths 8A and 8B are connected as two flow paths.

Each of the circulation flow paths 8A and 8B connected to the downstream side from the electrolysis device 12 can alternately pass alkaline water and acidic water generated by the electrolysis device 12. When the circulation flow path 8A allows alkaline water to flow, the circulation flow path 8B allows acidic water to flow, and when the circulation flow path 8A allows acidic water to flow, the circulation flow path 8B allows alkaline water to flow.

The circulation flow path 8A connected to the downstream side from the electrolysis device 12 is provided with a valve 28A and a pH sensor 14A in the middle thereof, and is connected to the batch treatment tank 6A. Similarly, the circulation flow path 8B connected to the downstream side from the electrolysis device 12 is provided with a valve 28B and a pH sensor 14B in the middle thereof, and is connected to the batch treatment tank 6B. Through the opening and closing of the valves 28A and 28B, the water flow/water stop from the electrolysis device 12 to the batch treatment tanks 6A and 6B are respectively controlled.

The circulation flow paths 8A and 8B having the above-described configurations constitute circulation flow paths respectively returning from the batch treatment tanks 6A and 6B to the batch treatment tanks 6A and 6B via the electrolysis device 12. The circulation flow paths 8A and 8B of the present embodiment merge at a position between the valve 24 and the electrolysis device 12 to form one flow path. As compared with the case where the circulation flow paths 8A and 8B are independent flow paths without merging, the device configuration of the water softening device 2 can be simplified such that only one pump 10 is required.

The pH sensors 14A and 14B are sensors for detecting pH values as parameters of water flowing through the circulation flow paths 8A and 8B, respectively. The pH values detected by the pH sensors 14A and 14B are used as parameters for determining continuation/stop of electrolysis by the electrolysis device 12 as described later. Details will be described later.

In addition to the circulation flow paths 8A and 8B, a flow path 34 is connected to the valve 26 provided at a position where the circulation flow paths 8A and 8B merge to form one flow path. The flow path 34 is connected to the separation device 16.

The separation device 16 is a device that separates crystals of metal components from water supplied from the flow path 34. The separation device 16 according to the embodiment is a cyclone-type separation device that separates solids such as crystals contained in water by centrifugal separation.

A flow path 36 and a flow path 38 are connected to the separation device 16 as two flow paths. The flow path 36 is a flow path through which water from which crystals have been separated by the separation device 16 flows. The flow path 38 is a drain flow path through which drain water containing crystals separated by the separation device 16 flows, and extends outside of the water softening device 2.

The flow path 36 through which water obtained by separating crystals flows is connected to the valve 30. A flow path 40 and a flow path 41 are connected to the valve 30.

The flow path 40 is a flow path connected to the intermediate tank 18. The intermediate tank 18 is a tank for temporarily storing water flowing through the flow path 40. Through opening and closing of the valve 30, water flow/water stop from the separation device 16 to the intermediate tank 18 via the flow paths 36 and 40 are controlled.

The flow path 41 is a bypass flow path for connecting the batch treatment tanks 6A and 6B and the intermediate tank 18 without flowing through the electrolysis device 12 and the separation device 16. Two flow paths 41A and 41B are connected to the flow path 41, and the flow paths 41A and 41B are respectively connected to the valves 28A and 28B described above.

A $CO_2$ supply line 42 is connected to the intermediate tank 18. The $CO_2$ supply line 42 is a pipe for supplying $CO_2$ gas to the water stored in the intermediate tank 18. By supplying the $CO_2$ gas through the $CO_2$ supply line 42, the turbidity of the water stored in the intermediate tank 18 can be reduced. A valve 32 is provided in the middle of the $CO_2$ supply line

42, and the supply/stop of the $CO_2$ gas is controlled by opening and closing of the valve 32.

A flow path 44 is further connected to the intermediate tank 18. The flow path 44 is connected to the water storage tank 20.

The water storage tank 20 is a tank for storing the treated water for which the water softening treatment has been completed. The treated water stored in the water storage tank 20, that is, soft water can be supplied to a water faucet or the like to be used by an end user.

The water storage tank 20 is provided with a pressure sensor (not illustrated). The water storage amount of the water storage tank 20 can be detected by detecting a decrease in pressure due to consumption of the treated water by the pressure sensor.

The controller 21 is a member that controls each component of the water softening device 2 described above. The controller 21 is electrically connected to each component of the water softening device 2, and executes opening/closing control of each valve, ON/OFF control of the pump 10, ON/OFF control of the electrolysis device 12, ON/OFF control of the separation device 16, and the like. The controller 21 includes, for example, a microcomputer including a processor and a memory storing a computer program executed by the processor.

The controller 21 of the present embodiment operates the water softening device 2 in each of the first mode and the second mode as two operation modes.

Figure 2:
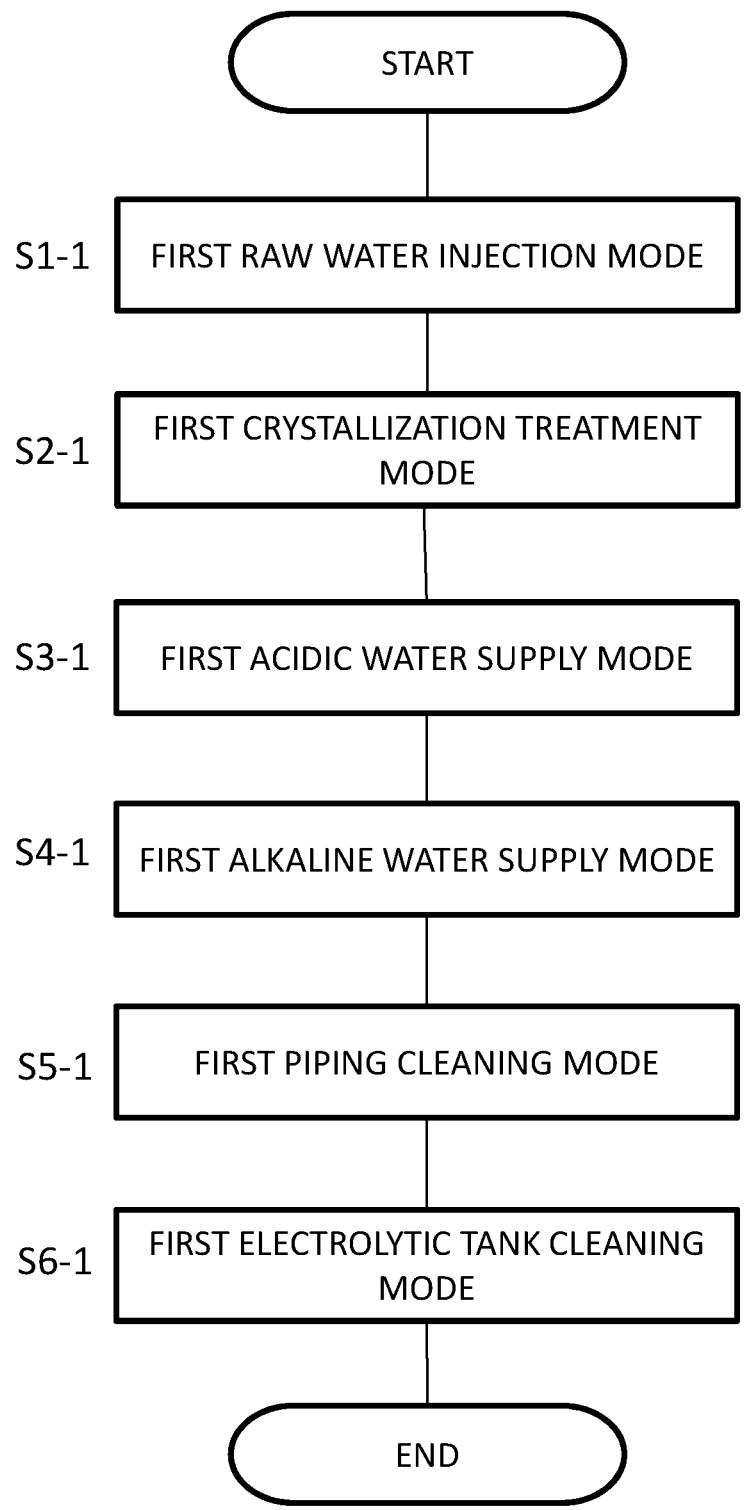
FIG. 2 is a flowchart of the water softening device illustrated in FIG. 1 executing a first mode.

First, the first mode will be described with reference to FIGS. 2 and 3 to 8. FIG. 2 is a flowchart of using the water softening device 2 executing the first mode. FIGS. 3 to 8 are schematic diagrams showing a flow of water and the like when the first mode is executed according to the flowchart shown in FIG. 2.

(First Raw Water Injection Mode)

Figure 3:
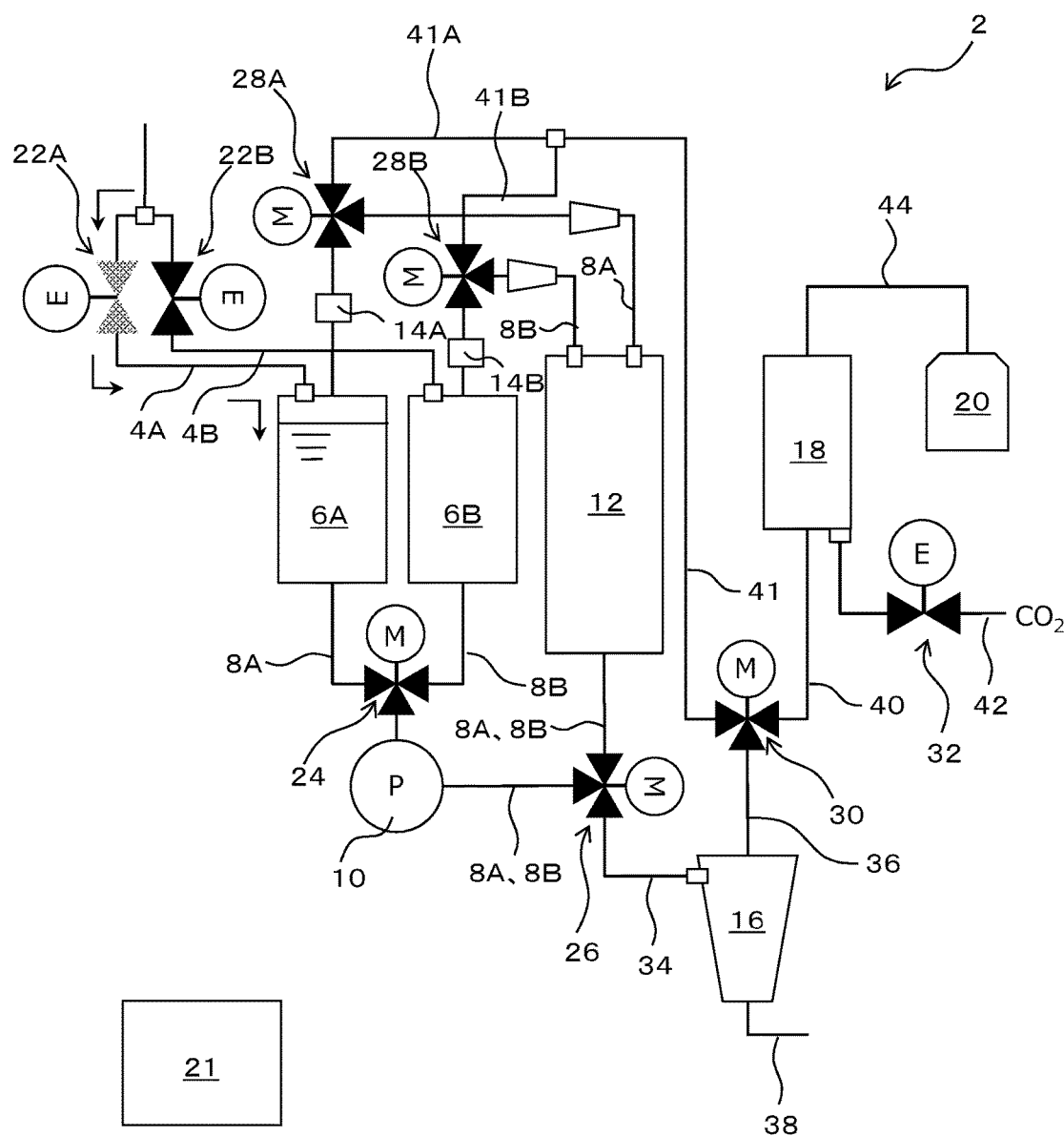
FIG. 3 is a diagram illustrating a flow of water in a first raw water injection mode in the first mode.

As shown in FIG. 2, the controller 21 first executes the first raw water injection mode (S1-1). The first raw water injection mode is a mode in which hard water as raw water is injected into the water softening device 2 upon starting the operation of the water softening device 2. Specifically, the controller 21 controls to generate a flow as illustrated in FIG. 3. In FIG. 3 and the following drawings, the flow of water is represented by an arrow, and it is assumed that no flow of water occurs in an flow path without an arrow. In addition, a state in which the valve is open is indicated by hatching, and a state in which the valve is closed is indicated by filling in black.

The controller 21 opens the valve 22A so that the raw water flows through the raw water flow path 4A. By passing the raw water through the raw water flow path 4A, the raw water flows through the raw water flow path 4A to the batch treatment tank 6A and stored in the batch treatment tank 6A. At this time, the controller 21 controls to close the valve 22B.

When a predetermined amount (for example, 10 L) of raw water flows through the batch treatment tank 6A, the controller 21 closes the valve 22A and executes the first crystallization treatment mode (step S2-1).

(First Crystallization Treatment Mode)

Figure 4:
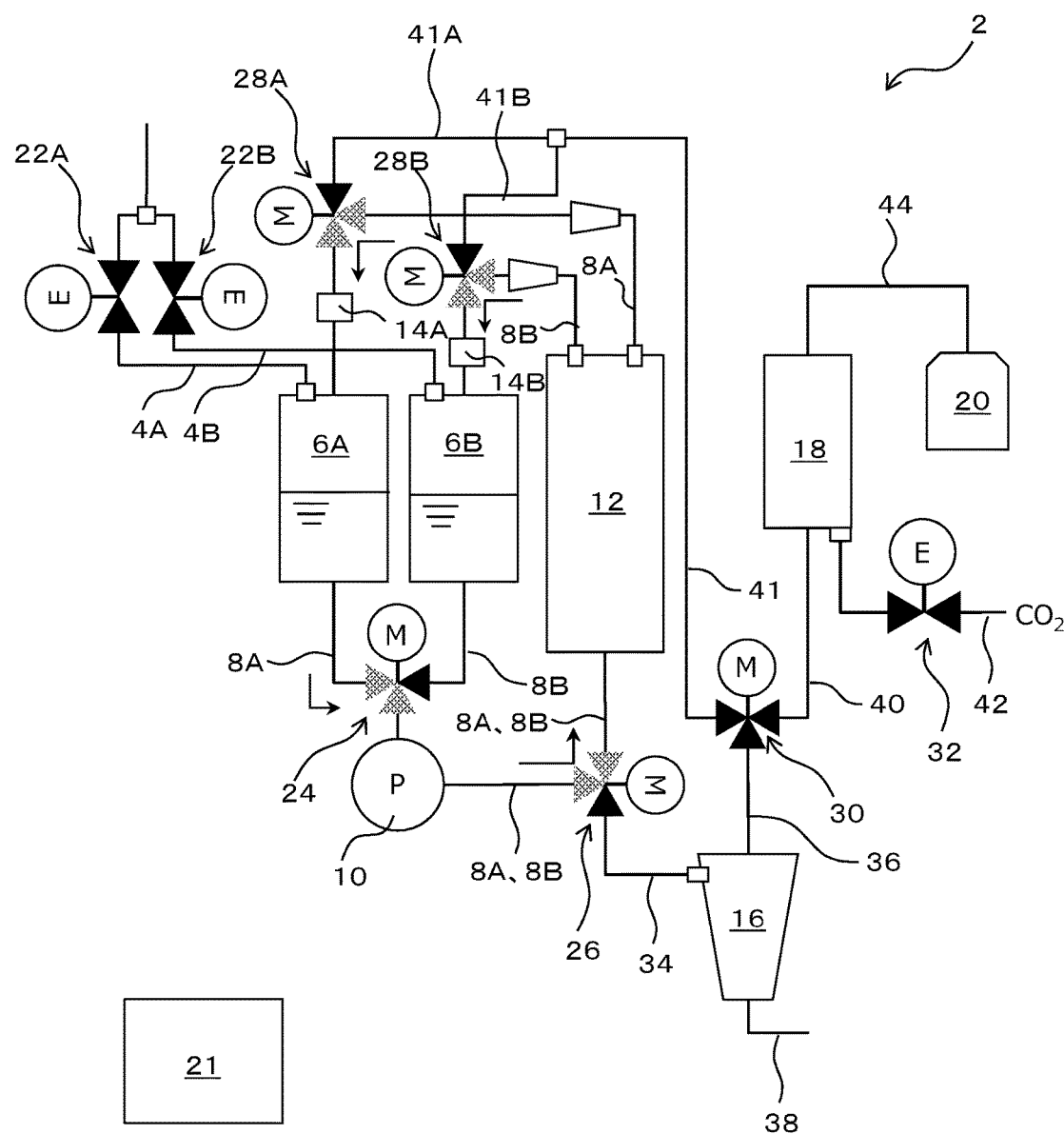
FIG. 4 is a diagram illustrating a flow of water in a first crystallization treatment mode in the first mode.

FIG. 4 shows a first crystallization treatment mode. The controller 21 controls to supply the raw water stored in the batch treatment tank 6A to the electrolysis device 12. Specifically, while the pump 10 is driven, the valve 24 is opened to allow water to flow from the batch treatment tank 6A to the circulation flow path 8A, and the valve 26 is opened to allow water to flow to the electrolysis device 12. At this time, the controller 21 controls opening and closing of the valve 24 so as to stop water downstream from the batch treatment tank 6B.

The controller 21' further drives the electrolysis device 12 to electrolyze the raw water supplied from the batch treatment tank 6A, thereby generating alkaline water and acidic water.

In the first crystallization treatment mode, the electrolysis device 12 is controlled such that, of the alkaline water and the acidic water generated by the electrolysis device 12, the alkaline water flows through the circulation flow path 8A and the acidic water flows through the circulation flow path 8B.

The controller 21 controls opening and closing of the valve 28A so as to return the alkaline water having flowed through the circulation flow path 8A to the batch treatment tank 6A, and controls opening and closing of the valve 28B so as to return the acidic water having flowed through the circulation flow path 8B to the batch treatment tank 6B. As a result, a flow of an arrow shown in FIG. 4 is generated.

According to the above operation, while the raw water in the batch treatment tank 6A is consumed, about half of the consumption amount of the alkaline water is newly stored in the batch treatment tank 6A, so that the water storage amount is consequently decreased, and the pH value detected by the pH sensor 14A is increased. On the other hand, since the acidic water is stored in the batch treatment tank 6B, the water storage amount increases, and the pH value detected by the pH sensor 14B is maintained at a low value.

In the circulation flow path 8A including the batch treatment tank 6A, the electrolysis by the electrolysis device 12 is continuously performed while the mixed water of the raw water and the alkaline water circulates, and the pH value also continuously increases.

Here, metal ions such as $Ca^{2+}$ and $Mg^{2+}$ contained in the raw water are electrophoresed from the anode (acidic water) to the cathode (alkaline water) through the diaphragm by electrolysis, and thus the hardness of the acidic water decreases. On the other hand, even in alkaline water containing a large amount of $OH^-$, reactions of the following Formulae 1 to 3 occur, so that the hardness in water decreases.

$$OH^- + HCO_3^- \rightarrow H_2O + CO_3^{2-} \quad \text{(Formula 1)}$$

$$Ca^{2+} + CO_3^{2-} \rightarrow CaCO_3 \quad \text{(Formula 2)}$$

$$Mg^{2+} + 2OH^- \rightarrow Mg(OH)_2 \quad \text{(Formula 3)}$$

As in Formula 1, $OH^-$ contained in alkaline water reacts with $HCO_3^-$ (bicarbonate ion) in water to produce water and $CO_3^{2-}$ (carbonate ion). The $CO_3^{2-}$ generated in the reaction of Formula 1 reacts with $Ca^{2+}$ as in Formula 2 to generate insoluble $CaCO_3$ (calcium carbonate). As in Formula 3, $Mg^{2+}$ reacts with $OH^-$ contained in alkaline water to generate insoluble $Mg(OH)_2$ (magnesium hydroxide). As $CaCO_3$ and $Mg(OH)_2$ are crystallized and precipitated, the concentration of metal ions in the alkaline water also decreases, so that the hardness of the alkaline water also decreases. As a result, the hardness of both acidic water and alkaline water is reduced.

By continuously supplying the alkaline water to the circulation flow path 8A and circulating the alkaline water, the reactions of the above Formulae 1 to 3 are continuously caused to crystallize and precipitate metal ions in the alkaline water, and the hardness of the raw water can be reduced.

The controller 21 ends the first crystallization treatment mode at a predetermined timing and executes the next first acidic water supply mode (step S3-1). The timing of ending the first crystallization treatment mode is determined based on the pH value of the alkaline water detected by the pH sensor 14A. Details will be described later.

(First Acidic Water Supply Mode)

Figure 5:
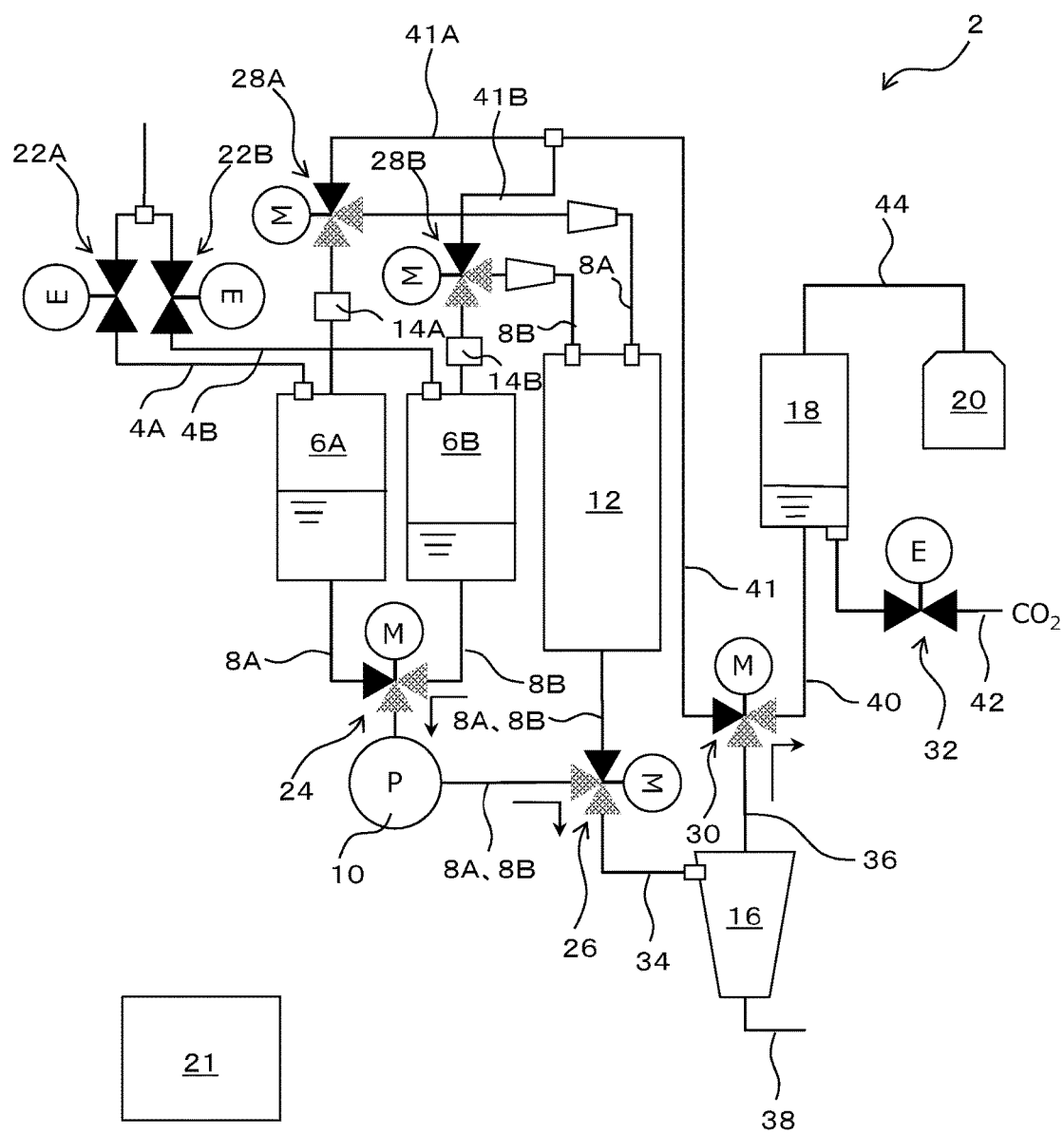
FIG. 5 is a diagram illustrating a flow of water in a first acidic water supply mode in the first mode.

FIG. 5 illustrates a first acidic water supply mode. The controller 21 controls the acidic water stored in the batch treatment tank 6B to be supplied to the intermediate tank 18 via the separation device 16. Specifically, while the pump 10 is driven, the valve 24 is opened to allow water to flow from the batch treatment tank 6B to the circulation flow path 8B, and the valve 26 is opened to allow water to flow from the circulation flow path 8B to the flow path 34.

The controller 21 does not operate the separation device 16, and allows the acidic water having reached the separation device 16 to pass to flow through the flow path 36. The controller 21 further opens valve 30 to allow the acidic water having flowed through the flow path 36 to flow through the flow path 40. As a result, the acidic water is allowed to flow through the flow path 40 to the intermediate tank 18.

According to the above operation, the storage amount of the acidic water in the intermediate tank 18 increases, while the storage amount of the acidic water in the batch treatment tank 6B decreases. The controller 21 of the present embodiment continues the first acidic water supply mode until the amount of the acidic water in the batch treatment tank 6B decreases to a predetermined amount (for example, 2 L). When the water storage amount of the batch treatment tank 6B decreases to the predetermined amount, the controller 21 stops the first acidic water supply mode and executes the next first alkaline water supply mode (S4-1).

(First Alkaline Water Supply Mode)

Figure 6:
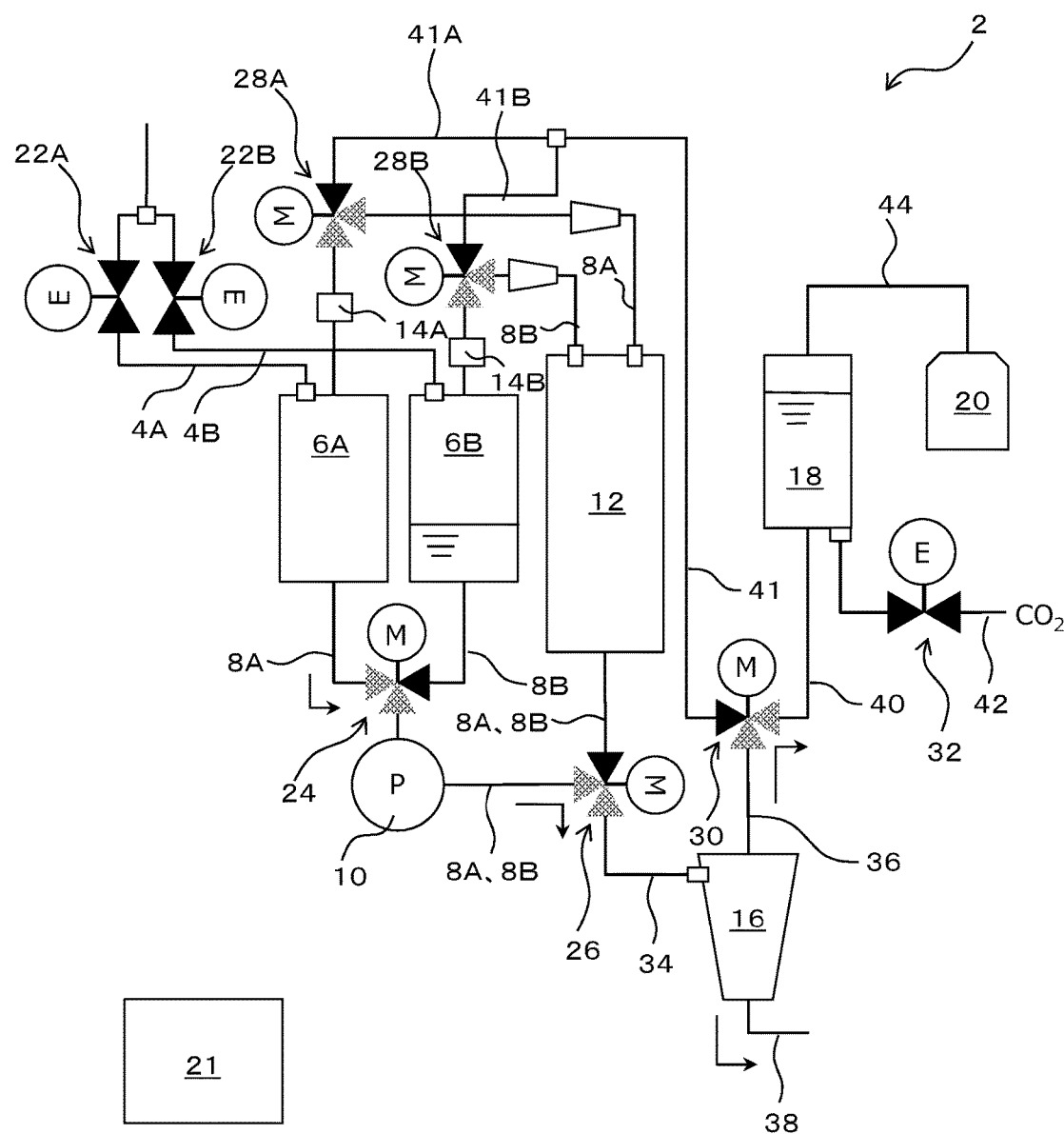
FIG. 6 is a diagram illustrating a flow of water in a first alkaline water supply mode in the first mode.

FIG. 6 illustrates a first alkaline water supply mode. The controller 21 controls the alkaline water stored in the batch treatment tank 6A to be supplied to the intermediate tank 18 via the separation device 16. While the operation of the separation device 16 is stopped in the first acidic water supply mode described above, crystals are separated from the alkaline water by operating the separation device 16 in the first alkaline water supply mode.

As shown in FIG. 6, while the pump 10 is driven, the valve 24 is opened to allow water to flow from the batch treatment tank 6A to the circulation flow path 8A, and the valve 26 is opened to allow water to flow from the circulation flow path 8A to the flow path 34.

The controller 21 separates crystals contained in the alkaline water by centrifugal separation by operating the separation device 16. The separation device 16 causes the alkaline water from which crystals have been separated to flow through the flow path 36, and causes drainage water containing crystals to flow through the flow path 38 to be drained.

The alkaline water after crystal separation which has flowed through the flow path 36 flows through the intermediate tank 18 through the flow path 40. Since the acidic water is already stored in the intermediate tank 18, the alkaline water and the acidic water are mixed in the intermediate tank 18. The mixed water of the alkaline water and the acidic water is neutralized, and the pH value becomes a value near neutral. Since the hardness of both the alkaline water and the acidic water is low as described above, the hardness of the mixed water is also low. As a result, the mixed water stored in the intermediate tank 18 is generated as soft water having a pH value near neutral and low hardness.

The alkaline water supplied to the intermediate tank 18 may contain crystals of $CaCO_3$ that could not be separated by the separation device 16. The controller 21 supplies $CO_2$ to the intermediate tank 18 by controlling opening and closing of the valve 32 so as to supply $CO_2$ from the $CO_2$ supply line 42 as necessary. This accelerates the reaction of the following Formula 4.

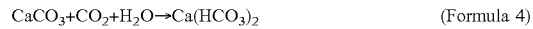

$$CaCO_3 + CO_2 + H_2O \rightarrow Ca(HCO_3)_2 \quad \text{(Formula 4)}$$

The crystal $CaCO_3$ reacts with $CO_2$ and $H_2O$ to generate soluble $Ca(HCO_3)_2$. The crystal can be dissolved in water by the reaction, and the turbidity of the treated water can be reduced. Note that the reaction formula for $Mg^{2+}$ is omitted.

According to the above operation, while the water storage amount of the mixed water in the intermediate tank 18 increases, the water storage amount of the alkaline water in the batch treatment tank 6A decreases. The controller 21 of the present embodiment continues the first alkaline water supply mode until the water storage amount of the batch treatment tank 6A reaches zero. When the water storage amount of the batch treatment tank 6A reaches zero, the controller 21 stops the first alkaline water supply mode and executes the next first piping cleaning mode (S5-1).

(First Piping Cleaning Mode)

Figure 7:
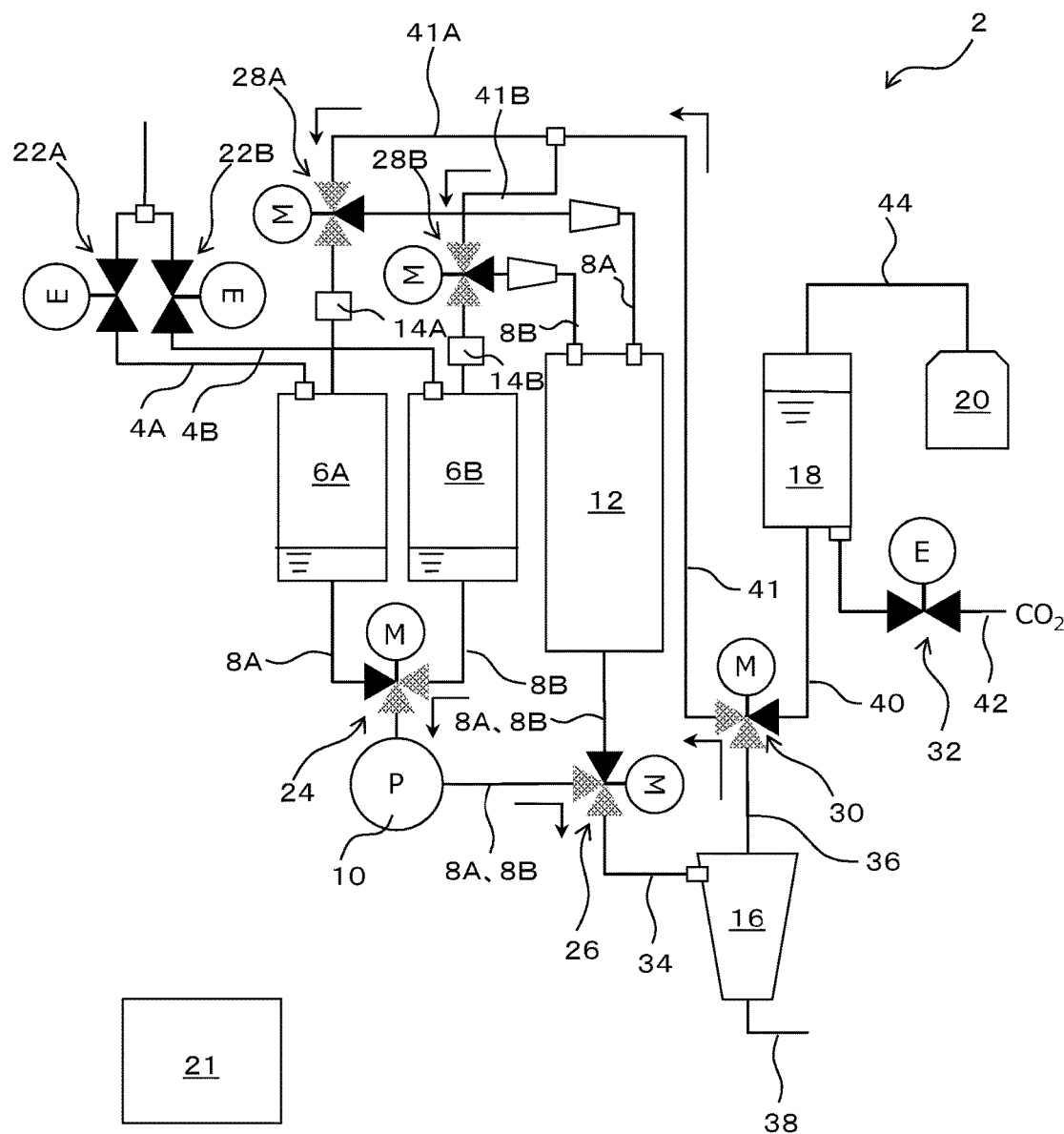
FIG. 7 is a diagram illustrating a flow of water in a first piping cleaning mode in the first mode.

FIG. 7 illustrates the first piping cleaning mode. The controller 21 controls the acidic water remaining in the batch treatment tank 6B to be returned to the batch treatment tanks 6A and 6B via the separation device 16 and the bypass flow paths 41, 41A, 41B.

Specifically, while the pump 10 is driven, the valve 24 is opened to allow water to flow from the batch treatment tank 6B to the circulation flow path 8B, and the valve 26 is opened to allow water to flow from the circulation flow path 8B to the flow path 34. The controller 21 does not operate the separation device 16, and allows the acidic water having reached the separation device 16 to pass to flow through the flow path 36.

The controller 21 further controls opening and closing of the valve 30 such that the acidic water having flowed through the flow path 36 flows through the flow path 41 and the flow paths 41A, 41B. The controller 21 further controls opening and closing of the valves 28A and 28B so that the acidic water having flowed through the flow paths 41A and 41B flows through the circulation flow paths 8A and 8B to the batch treatment tanks 6A and 6B.

As a result, a flow of the acidic water as illustrated in FIG. 7 is generated. When the acidic water flows through each pipe, the scale ($CaCO_3$) attached to the inner wall surface of each pipe can be dissolved in the acidic water to clean each pipe.

According to the above operation, the storage amount of the acidic water in the batch treatment tank 6A increases, and the storage amount of the acidic water in the batch treatment tank 6B decreases. When a predetermined amount (for example, 1 L) of the acidic water in the batch treatment tank 6B has flowed, the controller 21 ends the first piping cleaning mode and executes the next first electrolytic tank cleaning mode (S6-1).

(First Electrolytic Tank Cleaning Mode)

Figure 8:
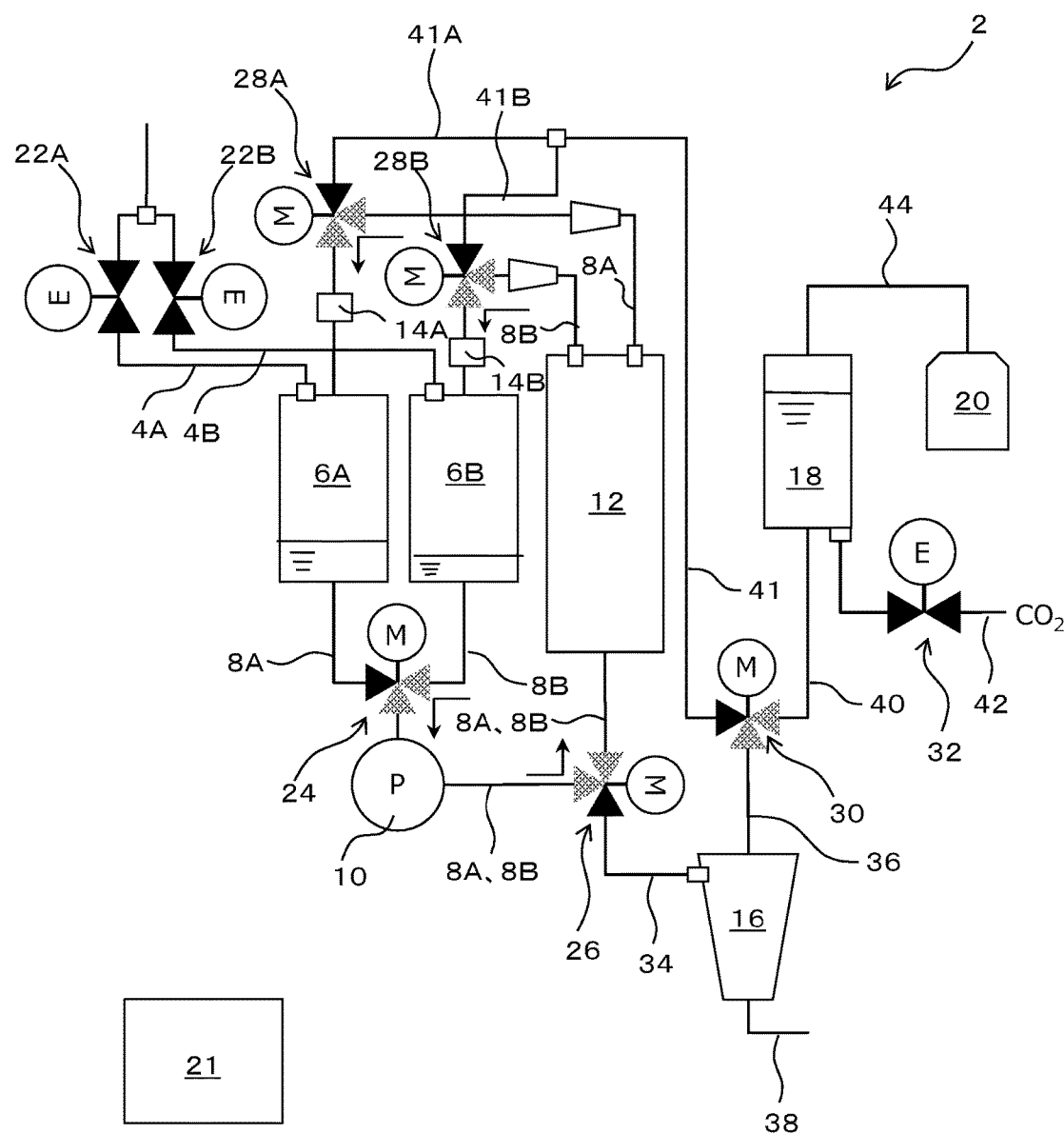
FIG. 8 is a diagram illustrating a flow of water in a first electrolytic tank cleaning mode in the first mode.

FIG. 8 illustrates the first electrolytic tank cleaning mode. The controller 21 controls the acidic water remaining in the batch treatment tank 6B to be returned to the batch treatment tanks 6A and 6B via the electrolysis device 12.

Specifically, while the pump 10 is driven, the valve 24 is opened to allow water to flow from the batch treatment tank 6B to the circulation flow path 8B, and the valve 26 is opened to allow water to flow from the circulation flow path 8B to the electrolysis device 12. The controller 21 does not operate the electrolysis device 12, and allows the acidic water reaching the electrolysis device 12 to pass as it is without being electrolyzed, and to flow through the circulation flow paths 8A and 8B. The controller 21 further controls opening and closing of the valves 28A and 28B so that the acidic water discharged from the electrolysis device 12 flows through the circulation flow paths 8A and 8B to the batch treatment tanks 6A and 6B.

As a result, a flow of the acidic water as illustrated in FIG. 8 is generated. When the acidic water flows through the electrolysis device 12 and each pipe, the scale attached to the electrolysis device 12 and the inner wall surface of each pipe can be dissolved in the acidic water to clean the electrolysis device 12 and each pipe.

According to the above operation, the storage amount of the acidic water in the batch treatment tank 6A increases, and the storage amount of the acidic water in the batch treatment tank 6B decreases. When a predetermined amount (for example, 1 L) of the acidic water in the batch treatment tank 6B has flowed, the controller 21 ends the first electrolytic tank cleaning mode. The acidic water remaining in the batch treatment tanks 6A and 6B may be discarded thereafter.

Execution of the first mode is completed by executing steps S1-1 to S6-1 described above.

Figure 9:
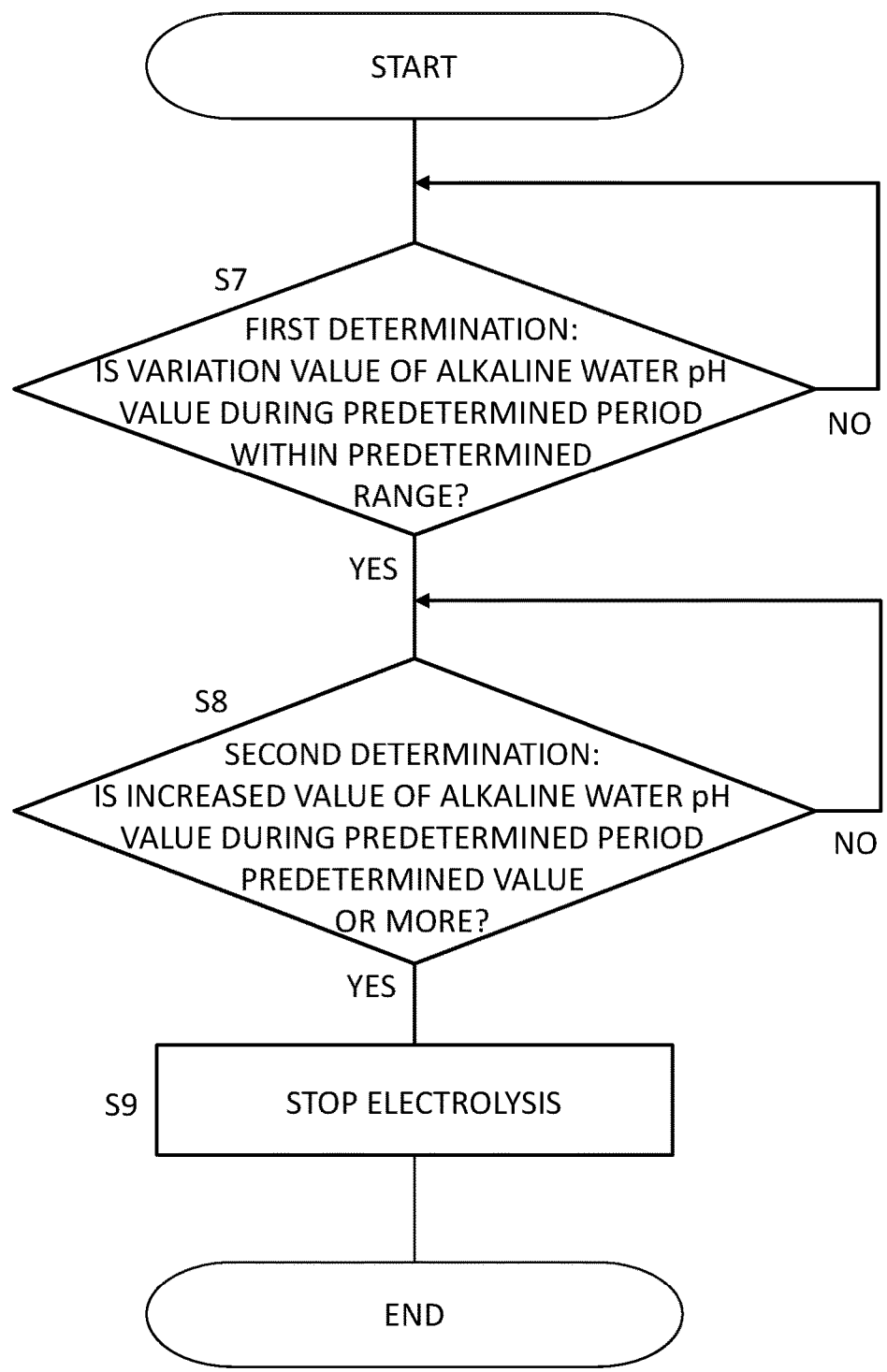
FIG. 9 is a flowchart showing a method for determining continuation/stop of electrolysis in the first crystallization treatment mode.

Here, a method for determining continuation/stop of the electrolysis by the electrolysis device 12 in the first crystallization treatment mode (S2-1) will be described with reference to FIGS. 4 and 9. FIG. 9 is a flowchart illustrating an example of a method for determining continuation/stop of the electrolysis by the electrolysis device 12.

In the water flow of the water softening device 2 illustrated in FIG. 4, the controller 21 monitors the pH value of the alkaline water based on the detection value periodically transmitted from the pH sensor 14A. As shown in FIG. 9, the controller 21 determines whether or not a variation value of the pH value of alkaline water during a predetermined period is within a predetermined range (S7: first determination). The predetermined period is, for example, 1 minute, and the predetermined range is, for example, −0.02 to 0.02.

When the variation value during the predetermined period is determined not to be within the predetermined range in the first determination (NO in S7), the controller 21 executes step S7 again. When, in the first determination, the variation value during the predetermined period is determined to be within the predetermined range (YES in S7), the controller 21 then determines whether or not the increased value during the predetermined period is the predetermined value or more with respect to the pH value of the alkaline water (S8: second determination). The predetermined period is, for example, 1 minute, and the predetermined value is, for example, 0.05.

When the increased value during the predetermined period is determined not to be the predetermined value or more in the second determination (NO in S8), the controller 21 executes step S8 again. When the increased value during the predetermined period is determined to be the predetermined value or more in the second determination (YES in S8), the controller 21 stops the electrolysis by the electrolysis device 12 (S9). By stopping the electrolysis, the first crystallization treatment mode (S2-1) is ended, and the mode shifts to the first acidic water supply mode (S3-1).

Figure 10:
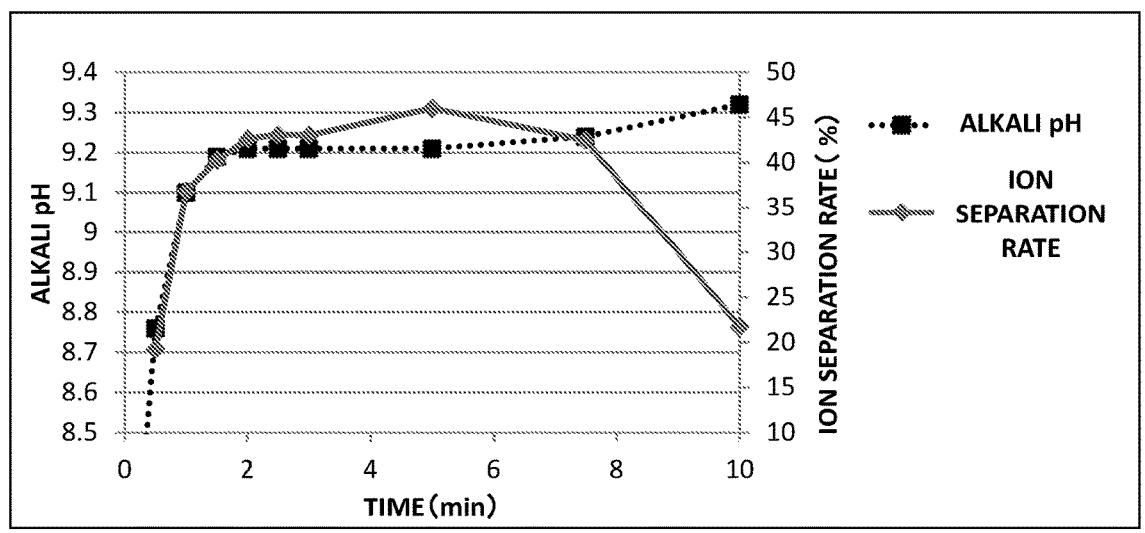
FIG. 10 is a graph showing temporal transition of "ALKALI pH" and "ION SEPARATION RATE" in the first crystallization treatment mode.

FIG. 10 shows an example of experimental data related to the method for determining continuation/stop of the electrolysis described in FIG. 9. FIG. 10 is a graph showing temporal transition of "ALKALI pH" and "ION SEPARATION RATE" in the first crystallization treatment mode performed under predetermined conditions. The horizontal axis represents time, and the vertical axis represents "ALKALI pH" and "ION SEPARATION RATE".

The "ALKALI pH" is a detection value of the pH sensor 14A, and indicates a pH value of the alkaline water (no unit). The "ION SEPARATION RATE" is a ratio obtained by dividing the hardness of the acidic water after electrolysis by the hardness of the raw water before electrolysis (unit: %). The ion separation rate is an index indicating the degree of decrease in hardness of raw water due to electrolysis. The higher the ion separation rate is, the lower the hardness of the acidic water is. The ion separation rate is calculated by detecting the hardness of the raw water and the acidic water using a hardness sensor which is not illustrated.

As shown in FIG. 10, when the electrolysis by the electrolysis device 12 is started, the value of "ALKALI pH" increases as the alkaline water is generated. On the other hand, since metal ions are attracted to the alkaline water by electrophoresis and the hardness of the acidic water decreases, the "ION SEPARATION RATE" also increases.

Thereafter, the increase in the alkali pH and the increase in the ion separation rate stop, and a steady state is attained (after about 2 minutes from the start). In the steady state, the reactions of Formulae 1 to 3 described above progress, and the crystallization of the metal components progresses.

After several minutes of the steady state (from about 2 minutes to about 8 minutes from the start), the alkali pH begins to rise again and the ion separation rate begins to drop sharply.

The reason why the alkali pH rises again is that as the reactions of Formulae 1 to 3 proceed, the substances ($HCO_3^-$ and the like) required for the reactions of Formulae 1 to 3 are reduced in amount from water, so that the reactions of Formulae 1 to 3 slow down, and the consumption of $OH^-$ is reduced. In addition, the reason why the ion separation rate drops is that the crystallization proceeds by the reactions of Formulae 1 to 3 to increase the mass of crystals, whereby the crystals of $CaCO_3$ are dissolved in an acid ($H^+$) to generate $Ca^{2+}$ as in the following Formula 5, and the hardness of acidic water increases. Note that the reaction formula for $Mg(OH)_2$ is omitted.

$$CaCO_3 + H^+ \rightarrow Ca^{2+} + HCO_3^-$$  (Formula 5)

In view of the fact that the "ALKALI pH" and the "ION SEPARATION RATE" exhibit behaviors as shown in FIG. 10, the controller 21 of the present embodiment performs the first determination (S7) and the second determination (S8) described above.

By determining whether or not the variation value of the alkali pH during the predetermined period is within the predetermined range by the first determination (S7), it is possible to determine whether or not it is in the steady state (period after about 2 minutes to about 8 minutes) shown in the graph of FIG. 10.

Furthermore, after the steady state is determined by the first determination (S7), it is determined whether or not the increased value of the alkali pH during the predetermined period is a predetermined value or more by the second determination (S8). As a result, it can be determined whether the alkali pH has re-increased (after about 8 minutes) as shown in the graph of FIG. 10.

When the re-increase in the alkali pH is detected by the second determination (S8), the electrolysis by the electrolysis device 12 is controlled to be stopped (S9), so that the electrolysis can be stopped at a time point (after about 8 minutes) before the ion separation rate starts to drop sharply.

As a result, the hardness of the acidic water generated by electrolysis can be maintained at a low value, and the hardness of the soft water finally produced by mixing the acidic water and the alkaline water can also be reduced. The hardness of the soft water can thus be reduced in the water softening device 2 that softens water using electrolysis.

When executing the first mode including steps S1-1 to S6-1 described above, the water softening device 2 of the present embodiment replaces the batch treatment tanks 6A and 6B and the circulation flow paths 8A and 8B used in the first mode, and executes the second mode as the similar water softening treatment. Specifically, after executing the first mode, the controller 21 executes the second mode along the flowchart shown in FIG. 11.

Figure 11:
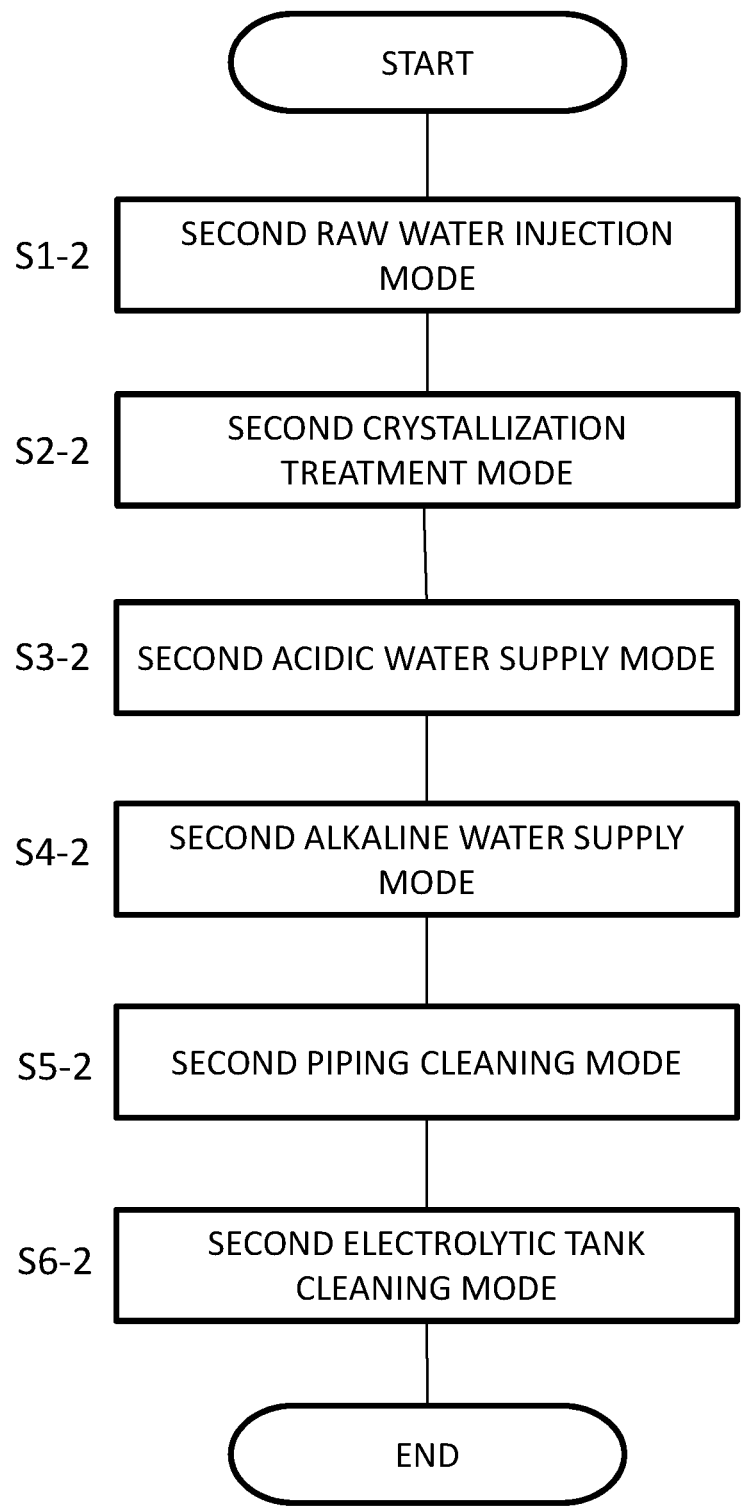
FIG. 11 is a flowchart of the water softening device illustrated in FIG. 1 executing a second mode.

As shown in FIG. 11, in the second mode, the controller 21 sequentially executes a second raw water injection mode (S1-2), a second crystallization treatment mode (S2-2), a second acidic water supply mode (S3-2), a second alkaline water supply mode (S4-2), a second piping cleaning mode (S5-2), and a second electrolytic tank cleaning mode (S6-2).

Figure 12:
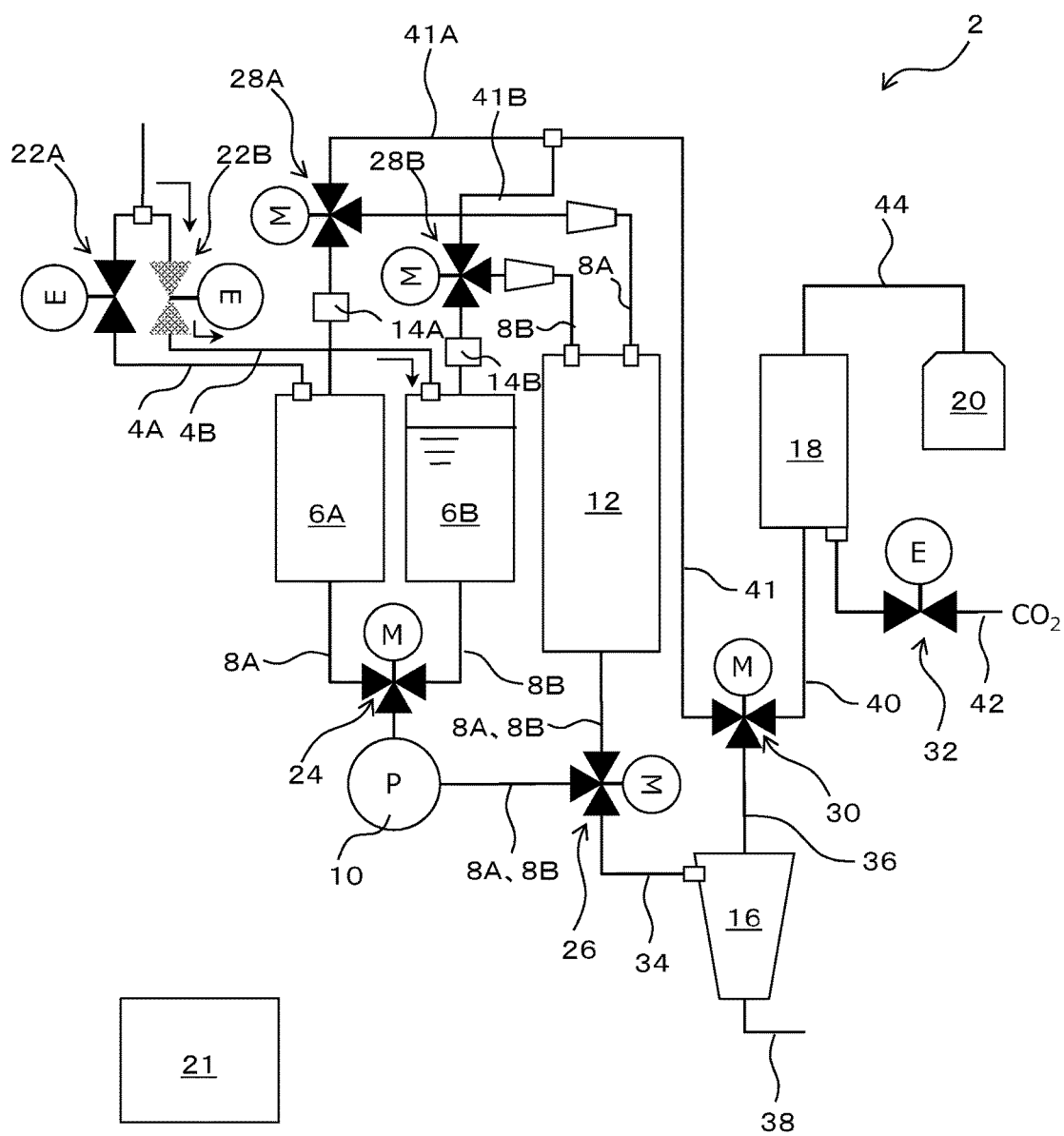
FIG. 12 is a diagram illustrating a flow of water in a second raw water injection mode in the second mode.
Figure 13:
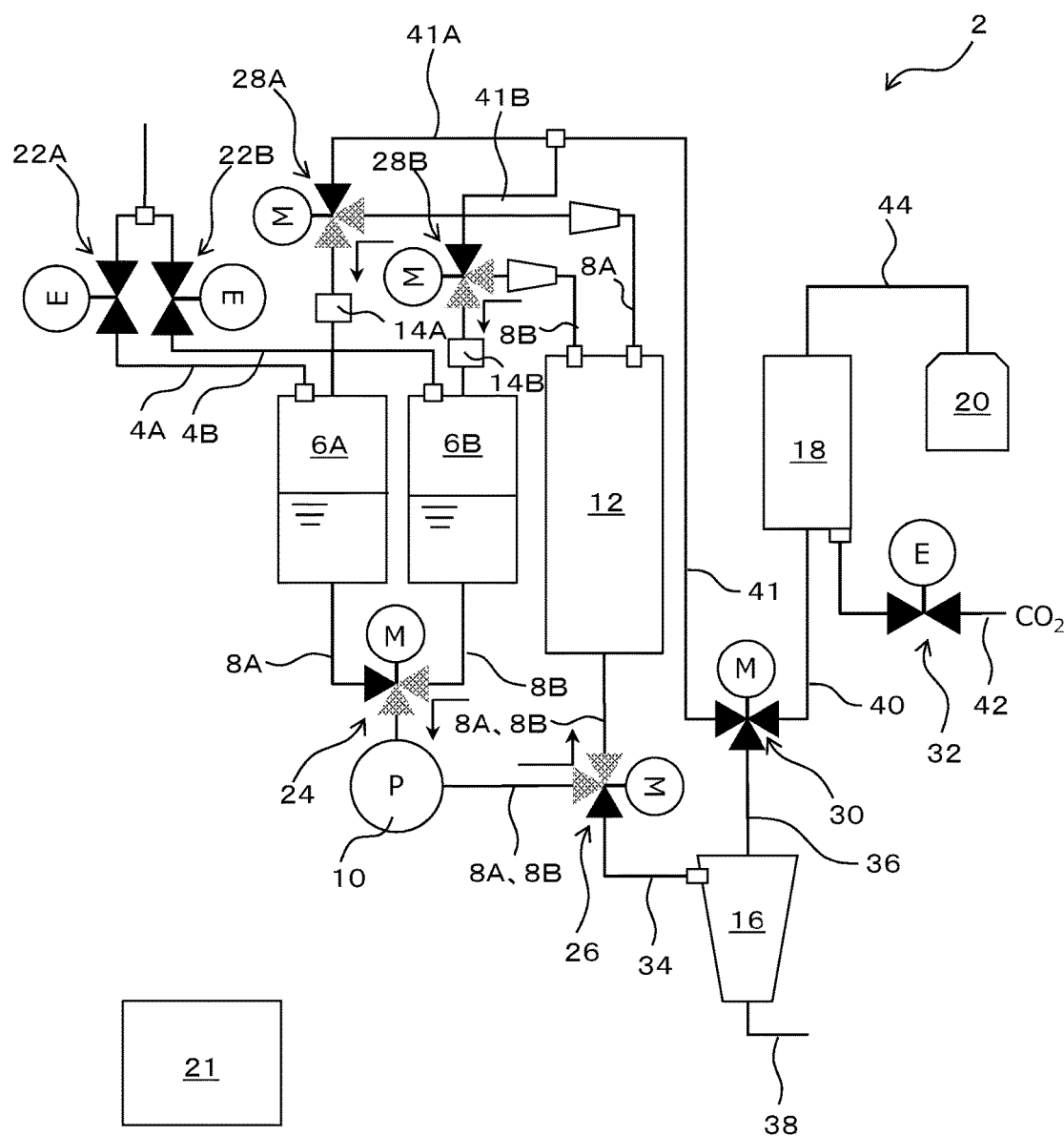
FIG. 13 is a diagram illustrating a flow of water in a second crystallization treatment mode in the second mode.
Figure 14:
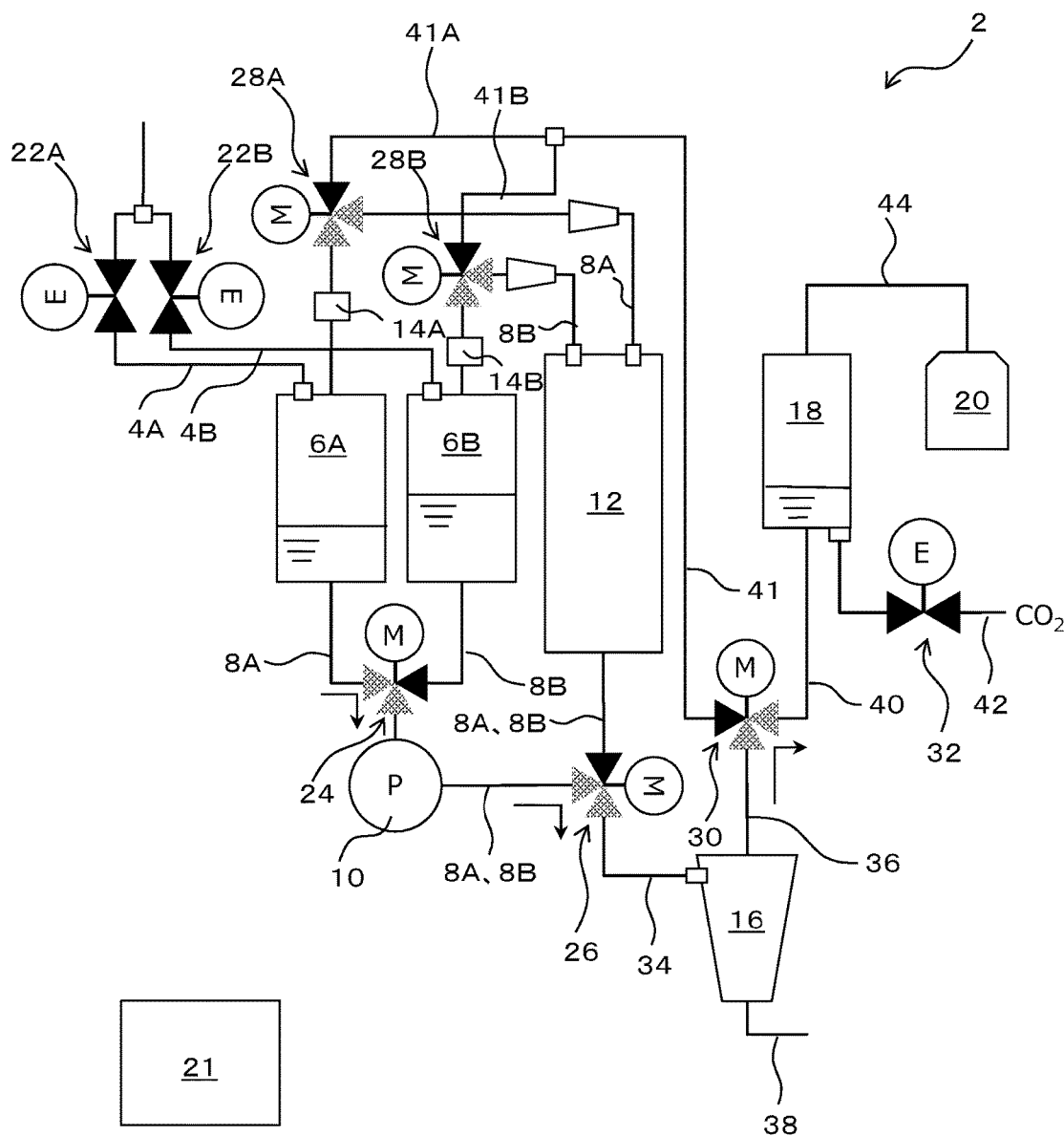
FIG. 14 is a diagram illustrating a flow of water in a second acidic water supply mode in the second mode.
Figure 15:
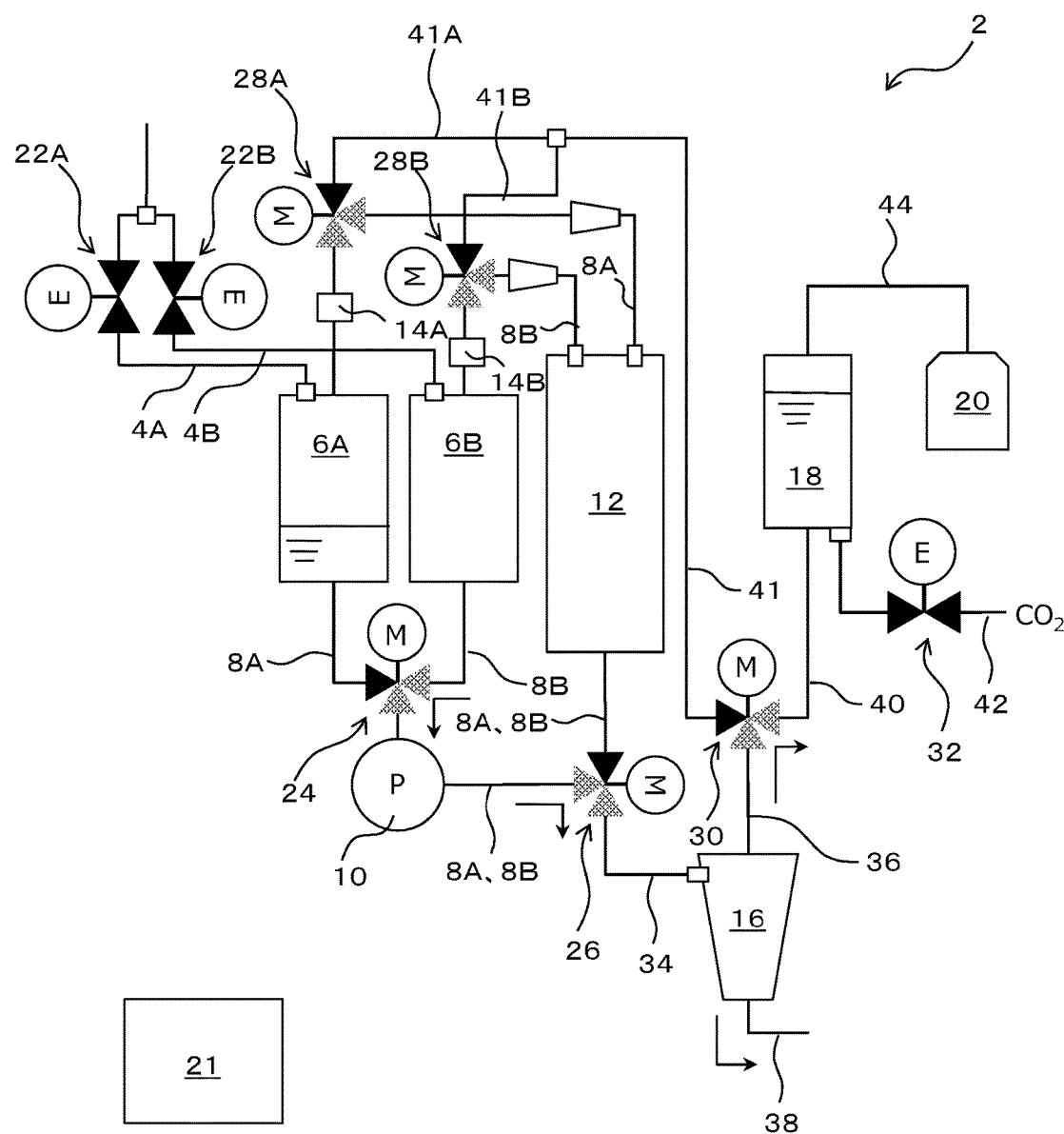
FIG. 15 is a diagram illustrating a flow of water in a second alkaline water supply mode in the second mode.
Figure 16:
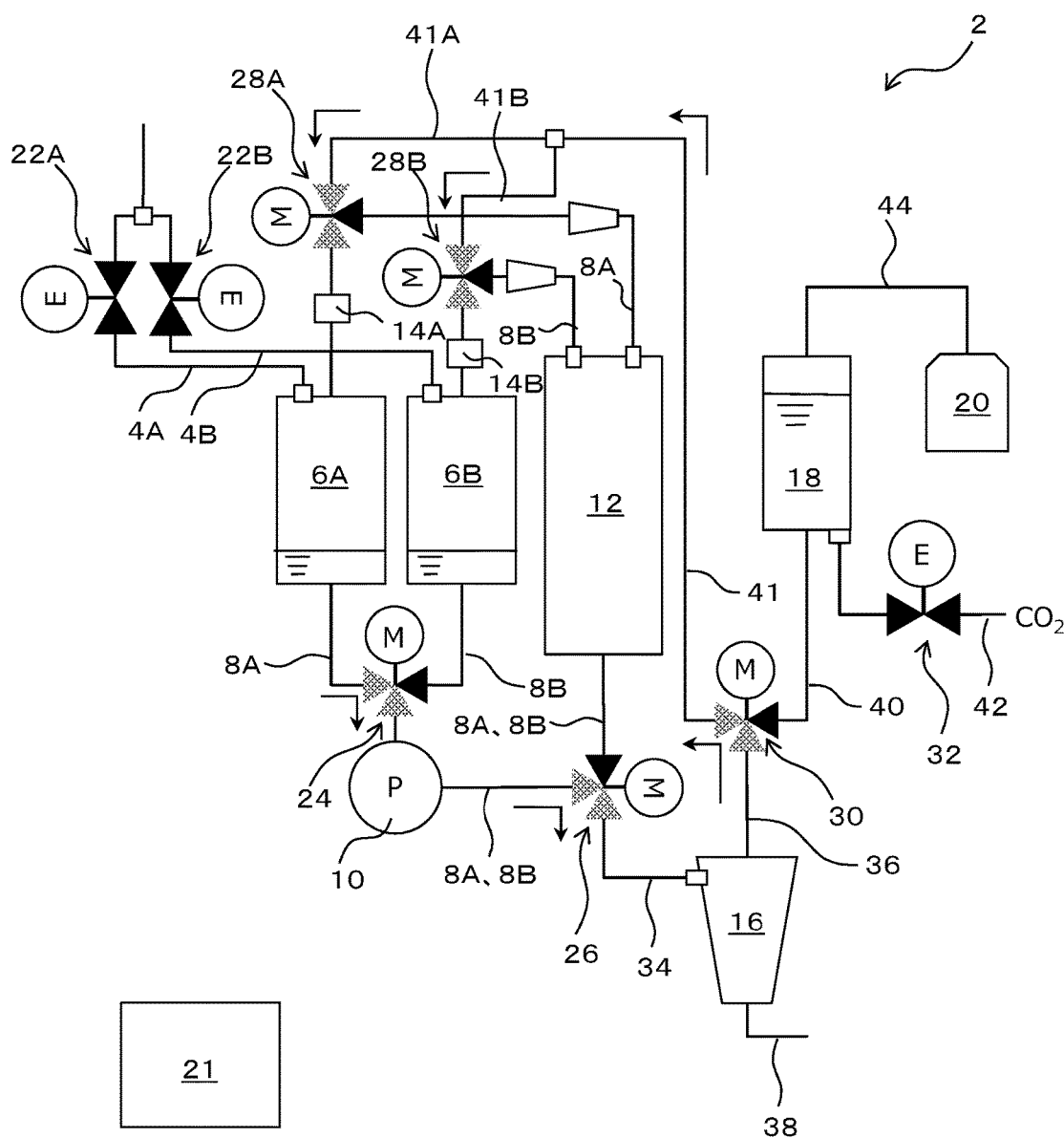
FIG. 16 is a diagram illustrating a flow of water in a second piping cleaning mode in the second mode.
Figure 17:
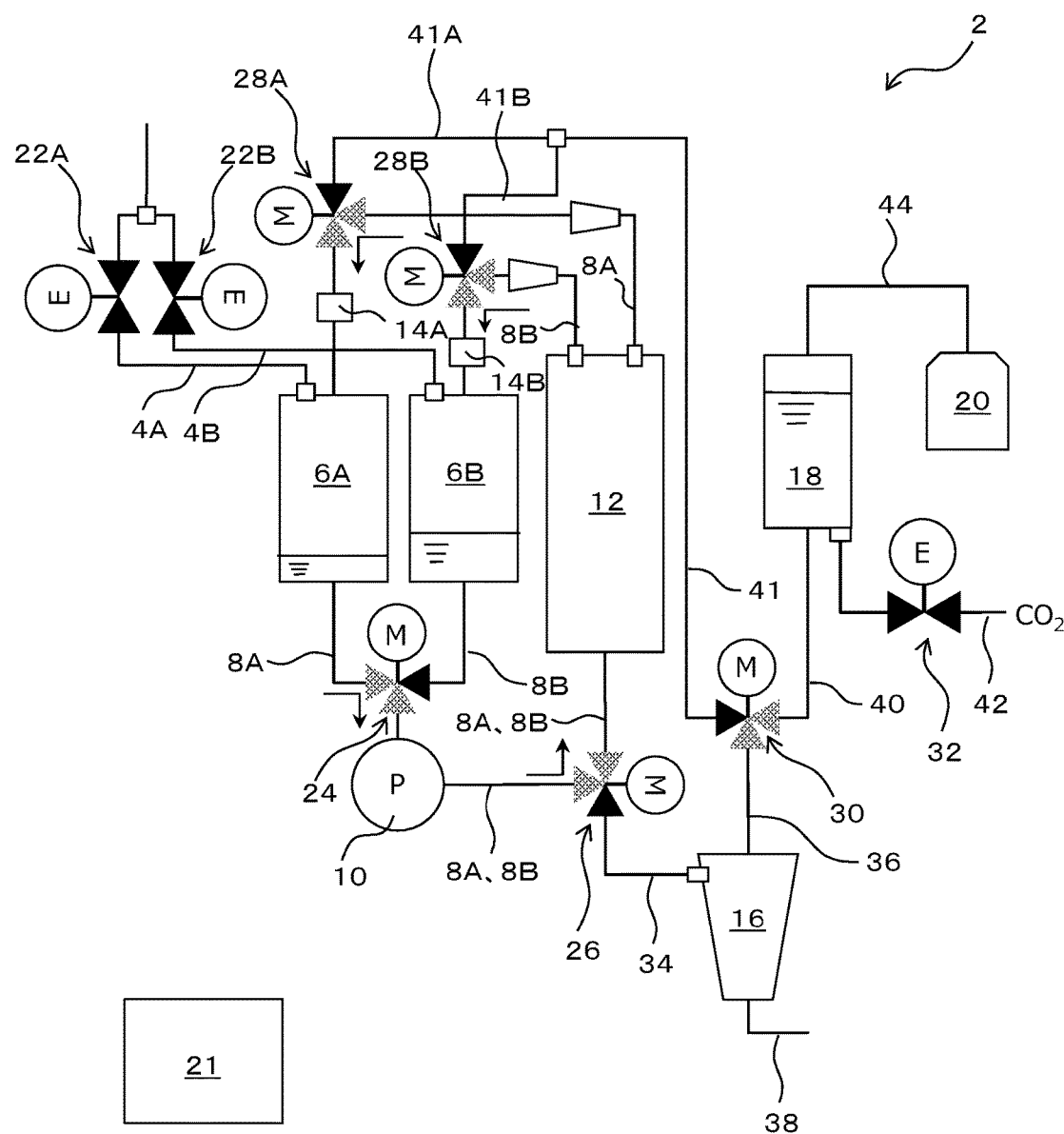
FIG. 17 is a diagram illustrating a flow of water in a second electrolytic tank cleaning mode in the second mode.

The flow of water in each mode of steps S1-2 to S6-2 is shown in FIGS. 12 to 17. FIG. 12 shows a second raw water injection mode, FIG. 13 shows a second crystallization treatment mode, FIG. 14 shows a second acidic water supply mode, FIG. 15 shows a second alkaline water supply mode, FIG. 16 shows a second piping cleaning mode, and FIG. 17 shows a second electrolytic tank cleaning mode.

In FIGS. 12 to 17, the flow of water is represented by an arrow as in FIGS. 3 to 8, and it is assumed that no flow of water occurs in a flow path without an arrow. In addition, a state in which the valve is open is indicated by hatching, and a state in which the valve is closed is indicated by filling in black.

As shown in FIGS. 12 to 17, the second mode is different from the first mode only in that the batch treatment tanks 6A and 6B and the circulation flow paths 8A and 8B are replaced.

As shown in FIG. 12, in the second raw water injection mode (S1-2), the raw water is injected into the batch treatment tank 6B. As shown in FIG. 13, in the second crystallization treatment mode (S2-2), the raw water stored in the batch treatment tank 6B is supplied to the electrolysis device 12 to perform electrolysis, the generated alkaline water is allowed to flow through the circulation flow path 8B while being circulated in the circulation flow path 8B including the batch treatment tank 6B, and the acidic water is allowed to flow through the circulation flow path 8A to be stored in the batch treatment tank 6A. As shown in FIG. 14, in the second acidic water supply mode (S3-2), the acidic water stored in the batch treatment tank 6A is supplied to the intermediate tank 18 via the separation device 16. As shown in FIG. 15, in the second alkaline water supply mode (S4-2), while the alkaline water stored in the batch treatment tank 6B is supplied to the separation device 16 to separate crystals, the alkaline water after crystal separation is supplied to the intermediate tank 18 to be mixed with the acidic water. As shown in FIG. 16, in the second piping cleaning mode (S5-2), the acidic water remaining in the batch treatment tank 6A is allowed to flow to the bypass flow paths 41, 41A, 41B via the separation device 16, thereby cleaning each pipe. As shown in FIG. 17, in the second electrolytic tank cleaning mode (S6-2), the acidic water remaining in the batch treatment tank 6A is allowed to flow to the electrolysis device 12 to clean the electrolysis device 12 and each pipe.

As in the first mode, in the second crystallization treatment mode (S2-2) shown in FIG. 13, the alkaline water is circulated through the circulation flow path 8B while electrolysis is performed by the electrolysis device 12. As a result, the metal components contained in the water are crystallized while increasing the pH value of the water flowing through the circulation flow path 8B, whereby the hardness of the raw water can be reduced.

Furthermore, in the second crystallization treatment mode (S2-2), the controller 21 executes the first determination (S7) and the second determination (S8) illustrated in FIG. 9 to determine continuation/stop of the electrolysis by the electrolysis device 12. Specifically, the continuation/stop of the electrolysis by the electrolysis device 12 is determined by performing the first determination (S7) and the second determination (S8) while monitoring the pH value of the alkaline water based on the detection value of the pH sensor 14B provided in the circulation flow path 8B. As a result, the electrolysis can be stopped at the time point (after about 8 minutes) before the ion separation rate drops sharply as shown in the graph of FIG. 10, and the hardness of the soft water to be finally produced can be lowered while the hardness of the acidic water is maintained at a low value.

The controller 21 alternately executes the first mode (S1-1 to S6-1) illustrated in FIG. 2 and the second mode (S1-2 to S6-2) illustrated in FIG. 11 to continuously produce the soft water.

The water softening device 2 described above includes the circulation flow paths 8A and 8B, the electrolysis device 12, the pH sensor 14A, the pH sensor 14B, and the controller 21. The pH sensor 14A is a first sensor that detects a pH value as a parameter of water flowing through the circulation flow path 8A (first circulation flow path). The pH sensor 14B is a second sensor that detects a pH value as a parameter of water flowing through the circulation flow path 8B (second circulation flow path). In such a configuration, the controller 21 controls the electrolysis device 12 so as to execute the first mode in which the alkaline water flows through the circulation flow path 8A and the acidic water flows through the circulation flow path 8B, and the second mode in which the acidic water flows through the circulation flow path 8A and the alkaline water flows through the circulation flow path 8B. The controller 21 further controls to stop the electrolysis by the electrolysis device 12 based on the detection value of the pH sensor 14A in the first mode, and controls to stop the electrolysis by the electrolysis device 12 based on the detection value of the pH sensor 14B in the second mode.

According to such a configuration, by controlling the operation of the electrolysis device 12 based on the detection values of the pH sensors 14A and 14B, it is possible to perform the operation of stopping the electrolysis at the time when the "ION SEPARATION RATE" starts to drop sharply, that is, at the time when the hardness of the acidic water starts to increase. As a result, the hardness of the soft water to be finally produced can be reduced.

In addition, the electrolysis by the electrolysis device 12 is controlled to stop based on the detection value of the pH sensor 14A in the first mode, and the electrolysis by the electrolysis device 12 is stopped based on the detection value of the pH sensor 14B in the second mode. That is, in the first mode and the second mode, the determination of continuation/stop of the electrolysis is based on the parameter of the alkaline water.

By thus using the alkaline water as a determination target, there is an advantage that a general-purpose and inexpensive configuration such as the pH sensors 14A and 14B can be used as compared with a case where the acidic water is a determination target (for example, a case where the hardness of acidic water is directly detected by a hardness sensor to determine continuation/stop of electrolysis).

In the water softening device 2 of the embodiment, the pH sensor 14A is provided downstream of the electrolysis device 12 and upstream of the batch treatment tank 6A in the circulation flow path 8A. In addition, the pH sensor 14B is provided downstream of the electrolysis device 12 and upstream of the batch treatment tank 6B in the circulation flow path 8B.

According to such an arrangement, since the pH values of both the alkaline water and the acidic water can be detected by the pH sensors 14A and 14B, it can be used for feedback for determination of the mixing ratio upon mixing the alkaline water and the acidic water, the supply amount of $CO_2$ by the $CO_2$ supply line 42, and the like.

In the water softening device 2 according to the embodiment, the controller 21 determines whether or not a variation value of the detection values (alkaline water) of the pH sensors 14A and 14B during the predetermined period is within the predetermined range (S7). When it is determined that the variation value is within the predetermined range (YES in S7), the controller 21 then determines whether or not an increased value of the detection value of the pH sensors 14A, 14B during the predetermined period is the predetermined value or more (S8). When it is determined that the increased value is the predetermined value or more (YES in S8), the controller 21 controls to stop electrolysis by the electrolysis device 12 (S9).

According to such a configuration, it is possible to perform an operation of stopping the electrolysis at the time point when the "ION SEPARATION RATE" starts to drop sharply, that is, at the time point when the hardness of the acidic water starts to increase, and the hardness of the soft water to be finally produced can be made lower.

The water softening device 2 according to the embodiment further includes the batch treatment tank 6A (first batch treatment tank) provided in the middle of the circulation flow path 8A, the batch treatment tank 6B (second batch treatment tank) provided in the middle of the circulation flow path 8B, and the valve 24. The valve 24 controls water flow/water stop from the first batch treatment tank 6A to the downstream side and water flow/water stop from the second batch treatment tank 6B to the downstream side. In such a configuration, the controller 21 controls the valve 24 so that water flows downstream from the batch treatment tank 6A and water is stopped in the batch treatment tank 6B in the first mode, and controls the valve 24 so that water flows downstream from the batch treatment tank 6B and water is stopped in the batch treatment tank 6A in the second mode.

According to such a configuration, it is possible to perform an operation of circulating the alkaline water in each of the circulation flow paths 8A and 8B while storing the acidic water generated by electrolysis in the batch treatment tanks 6A and 6B.

In the water softening device 2 of the embodiment, the circulation flow paths 8A and 8B merge at positions extending downstream from the batch treatment tanks 6A and 6B, respectively, and are connected to the electrolysis device 12.

According to such a configuration, the device configuration of the water softening device 2 can be simplified.

Note that the invention is not limited to the above embodiment, and can be implemented in various other modes. For example, in the embodiment, the case where the continuation/stop of the electrolysis is determined based on the pH value of the alkaline water flowing through the circulation flow paths 8A and 8B using the pH sensors 14A and 14B has been described, but the invention is not limited thereto. A sensor different from the pH sensor may be used to detect a parameter different from the pH value, and the continuation/stop of the electrolysis may be determined based on the value thus detected. Specific examples of the other sensors include a conductivity sensor, a TDS sensor, a turbidity sensor, a chromaticity sensor, and a hardness sensor.

Figure 18A:
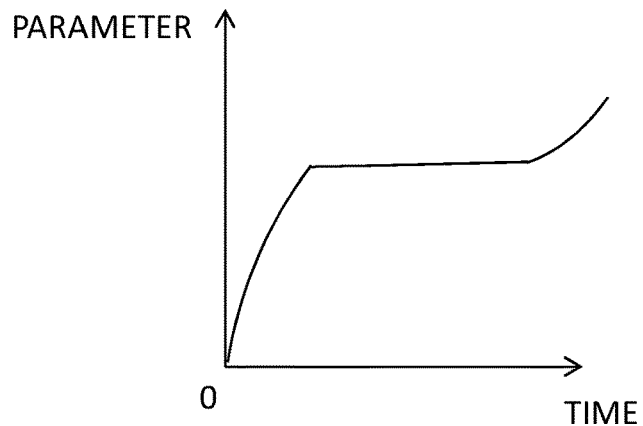
FIG. 18A is a schematic diagram illustrating temporal transition of parameters in a case where a conductivity sensor or a TDS sensor is used.

The conductivity sensor detects "conductivity", the TDS sensor detects "total dissolved individual amount", the turbidity sensor detects "turbidity", the chromaticity sensor detects "chromaticity", and the hardness sensor detects "hardness" as a parameter of water. FIGS. 18A to 18 C show temporal transition of each parameter at the time of electrolysis when these sensors are used.

FIG. 18A is a schematic diagram illustrating temporal transition of a detected value of each parameter in a case where a conductivity sensor or a TDS sensor is used.

As shown in FIG. 18A, when the conductivity sensor or the TDS sensor is used, the detected value of the parameter shows a temporal transition similar to that when the pH sensors 14A and 14B are used (see FIG. 10). Specifically, the parameter increases with the start of electrolysis, then reaches a steady state, and then increases again. Since the timing of the re-increase corresponds to the timing at which the hardness of the acidic water starts to increase, the continuation/stop of the electrolysis may be determined by performing the first determination (S7) and the second determination (S8) in a similar manner to FIG. 9. Accordingly, the same operations and effects as those of the embodiment can be achieved.

Figure 18B:
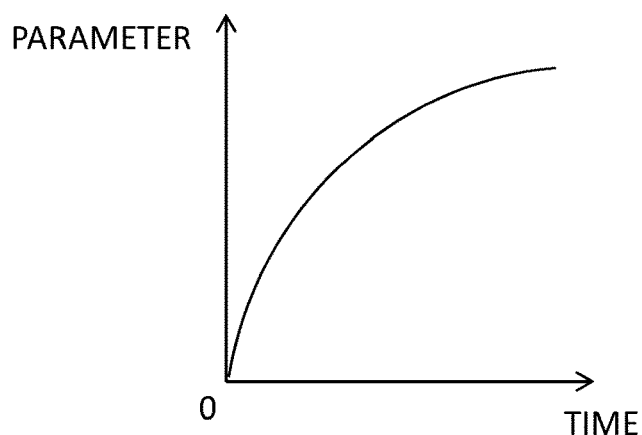
FIG. 18B is a schematic diagram illustrating temporal transition of parameters in a case where a turbidity sensor or a chromaticity sensor is used.

FIG. 18B is a schematic diagram illustrating temporal transition of a detected value of each parameter in a case where a turbidity sensor or a chromaticity sensor is used.

As shown in FIG. 18B, when the turbidity sensor or the chromaticity sensor is used, the detected value of the parameter shows a behavior different from that of the parameter when the pH sensors 14A and 14B, the conductivity sensor, or the TDS sensor is used. Specifically, the parameter increases with the start of electrolysis, but the rate of increase gradually decreases, reaches a saturated state at a certain point of time, and the increase in the parameter substantially stops. Since the saturation point at which the increase in the parameter stops corresponds to the timing at which the hardness of the acidic water starts to increase, the continuation/stop of the electrolysis may be determined by determining whether or not the saturation point has been reached. Specifically, based on the detection value of the turbidity sensor or the chromaticity sensor, control may be performed such that the electrolysis by the electrolysis device 12 is stopped when the increase rate (change rate) of the parameter per unit time becomes the predetermined value or less.

Figure 18C:
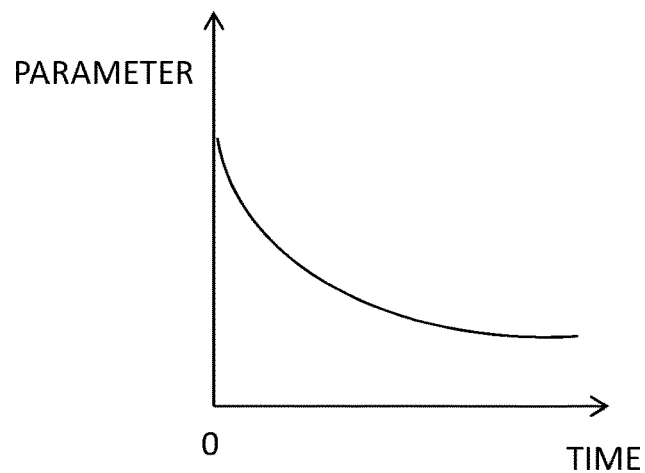
FIG. 18C is a schematic diagram illustrating temporal transition of parameters in a case where a hardness sensor is used.

FIG. 18C is a schematic diagram illustrating temporal transition of a detected value of a parameter in a case where a hardness sensor is used.

As shown in FIG. 18C, when the hardness sensor is used, the detected value of the parameter shows a behavior different from that of FIGS. 18A and 18B. Specifically, the parameter decreases with the start of the electrolysis, but the rate of decrease gradually decreases, reaches a saturated state at a certain point of time, and the decrease in the parameter substantially stops. Since the saturation point at which the decrease in the parameter stops corresponds to the timing at which the hardness of the acidic water starts to increase, the continuation/stop of the electrolysis may be determined by determining whether or not the saturation point has been reached. Specifically, based on the detection value of the hardness sensor, control may be performed such that the electrolysis by the electrolysis device 12 is stopped when the decrease rate (change rate) of the parameter per unit time becomes the predetermined value or less.

When each of the above-described sensors is used, not the alkaline water but the acidic water may be used as a determination target according to characteristics of the sensor or the like. That is, the continuation/stop of the electrolysis may be determined based on the detected value of the parameter of the acidic water. For example, when a pH sensor, a conductivity sensor, or a hardness sensor is used, the acidic water may be used as the determination target instead of the alkaline water. In particular, by detecting the hardness of the acidic water as a determination parameter using the hardness sensor, it is possible to more directly monitor the hardness change of the acidic water.

Not limited to the sensors described above, any sensor may be used as long as it can detect a parameter related to the timing at which the ion separation rate starts to drop sharply, that is, the timing at which the hardness of the acidic water starts to increase. Such a sensor may be collectively referred to as a "crystallinity degree sensing sensor", an "acidic water hardness sensing sensor", or the like.

In the above embodiment, the batch treatment tanks 6A and 6B are respectively provided in the middle of the circulation flow paths 8A and 8B, but the invention is not limited thereto. The batch treatment tanks 6A and 6B may not be provided. Even in such a case, by devising the shapes and lengths of the circulation flow paths 8A and 8B or appropriately providing the valves, it is possible to execute the operation of circulating the alkaline water similarly to the first crystallization treatment mode (S2-1) and the second crystallization treatment mode (S2-2) described above.

In the above embodiment, the first alkaline water supply mode is executed after the first acidic water supply mode in the first mode illustrated in FIG. 2, and the second alkaline water supply mode is executed after the second acidic water supply mode in the second mode illustrated in FIG. 11; however, the invention is not limited thereto. The acidic water supply mode may be executed after the alkaline water supply mode.

It should be noted that by appropriately combining the various modes described above, the effects of the respective modes can be produced.

Although the invention has been fully described in connection with preferred embodiment with reference to the accompanying drawings, various changes and modifications are obvious to those skilled in the art. Such changes and modifications are to be understood as being encompassed in the scope of the invention as set forth in the appended claims. In addition, combinations of elements and changes in order in the embodiment can be realized without departing from the scope and spirit of the invention.

INDUSTRIAL APPLICABILITY

The invention is useful for both a water softening device for home use and a water softening device for industrial use.

REFERENCE NUMERALS

2 Water softening device
4A Raw water flow path
4B Raw water flow path
6A Batch treatment tank (first batch treatment tank)
6B Batch treatment tank (second batch treatment tank)
8A Circulation flow path (first circulation flow path)
8B Circulation flow path (second circulation flow path)
10 Pump
12 Electrolysis device
14A pH sensor (first sensor, first pH sensor)
14B pH sensor (second sensor, second pH sensor)
16 Separation device
18 Intermediate tank
20 Water storage tank
21 Controller
22A, 22B, 24, 26, 28A, 28B, 30, 32 Valve
34 Flow path
36 Flow path
38 Flow path (drainage flow path)
40 Flow path
41, 41A, 41B Flow path (bypass flow path)
42 $CO_2$ supply line
44 Flow path

The invention claimed is:

1. A water softening device comprising:
an electrolysis device that generates alkaline water and acidic water by electrolysis;
a first circulation flow path and a second circulation flow path connected to the electrolysis device, the first circulation flow path and the second circulation flow path being capable of alternately passing the alkaline water and the acidic water generated by the electrolysis device;
a first sensor that detects a parameter of water flowing through the first circulation flow path;
a second sensor that detects a parameter of water flowing through the second circulation flow path; and
a controller,
wherein the controller
controls the electrolysis device to execute a first mode in which the alkaline water is allowed to flow through the first circulation flow path and the acidic water is allowed to flow through the second circulation flow path, and a second mode in which the acidic water is allowed to flow through the first circulation flow path and the alkaline water is allowed to flow through the second circulation flow path, and
controls to stop electrolysis by the electrolysis device based on a detection value of the first sensor or the second sensor in the first mode and the second mode
wherein the first sensor and the second sensor are any one of a pH sensor, a turbidity sensor, a conductivity sensor, a hardness sensor, a chromaticity sensor, and a TDS sensor
wherein the first sensor and the second sensor are any one of a pH sensor, a conductivity sensor, and a TDS sensor; and
the controller
determines whether or not a variation value of the detection value of the first sensor during a predetermined period is within a predetermined range in the first mode,
when it is determined that the variation value is within the predetermined range, then determines whether or not an increased value of the detection value of the first sensor during the predetermined period is the predetermined value or more,
controls to stop electrolysis by the electrolysis device when the increased value is determined to be the predetermined value or more, determines whether or not a variation value of the detection value of the second sensor during a predetermined period is within a predetermined range in the second mode, when it is determined that the variation value is within the predetermined range, then determines whether or not an increased value of the detection value of the second sensor during the predetermined period is a predetermined value or more, and controls to stop electrolysis by the electrolysis device when the increased value is determined to be the predetermined value or more.

2. The water softening device according to claim 1, wherein the controller controls to stop electrolysis by the electrolysis device based on the detection value of the first sensor in the first mode, and controls to stop electrolysis by the electrolysis device based on the detection value of the second sensor in the second mode.

3. A water softening device comprising:
an electrolysis device that generates alkaline water and acidic water by electrolysis;
a first circulation flow path and a second circulation flow path connected to the electrolysis device, the first circulation flow path and the second circulation flow path being capable of alternately passing the alkaline water and the acidic water generated by the electrolysis device;
a first sensor that detects a parameter of water flowing through the first circulation flow path;
a second sensor that detects a parameter of water flowing through the second circulation flow path; and
a controller,
wherein the controller
controls the electrolysis device to execute a first mode in which the alkaline water is allowed to flow through the first circulation flow path and the acidic water is allowed to flow through the second circulation flow path, and a second mode in which the acidic water is allowed to flow through the first circulation flow path and the alkaline water is allowed to flow through the second circulation flow path, and controls to stop electrolysis by the electrolysis device based on a detection value of the first sensor or the second sensor in the first mode and the second mode, the water softening device further comprising:
a first batch treatment tank provided in the first circulation flow path;
a second batch treatment tank provided in the second circulation flow path; and
a valve that controls water flow/water stop from the first batch treatment tank to downstream thereof and water flow/water stop from the second batch treatment tank to downstream thereof,
wherein the controller,
in the first mode, controls the valve so that water flows downstream from the first batch treatment tank and water is stopped from the second batch treatment tank, and
in the second mode, controls the valve so that water flows downstream from the second batch treatment tank and water is stopped from the first batch treatment tank.

4. The water softening device according to claim 3, wherein the first sensor is provided downstream of the electrolysis device and upstream of the first batch treatment tank in the first circulation flow path, and the second sensor is provided downstream of the electrolysis device and upstream of the second batch treatment tank in the second circulation flow path.

5. The water softening device according to claim 3, wherein the first circulation flow path and the second circulation flow path merge at positions extending downstream from the first batch treatment tank and the second batch treatment tank respectively, and then are connected to the electrolysis device.

\* \* \* \* \*